United States Patent [19]

Hon

[11] Patent Number: 4,462,606
[45] Date of Patent: Jul. 31, 1984

[54] FOLDABLE AND PORTABLE VEHICLE

[75] Inventor: David T. Hon, Los Angeles, Calif.

[73] Assignee: Hon Corporation International, Los Angeles, Calif.

[21] Appl. No.: 427,555

[22] Filed: Sep. 29, 1982

Related U.S. Application Data

[62] Division of Ser. No. 233,624, Feb. 12, 1981, Pat. No. 4,433,852.

[51] Int. Cl.³ .............................................. B62K 21/24
[52] U.S. Cl. .................................. 280/278; 74/551.1; 280/287; 403/102
[58] Field of Search .................. 280/278, 287; 403/92, 403/102, 85; 74/551.1, 551.3, 551.7

[56] References Cited

U.S. PATENT DOCUMENTS

| | | | |
|---|---|---|---|
| 2,363,667 | 11/1944 | Griswold | 403/102 |
| 3,015,498 | 1/1962 | Tanaka et al. | 280/278 |
| 3,074,741 | 1/1963 | Rutkoue | 403/92 |
| 4,067,589 | 1/1978 | Hon | 280/278 |
| 4,113,271 | 9/1978 | Furia | 403/92 |
| 4,202,561 | 5/1980 | Yonkers | 280/278 |
| 4,284,288 | 8/1981 | Fulton | 280/278 |

Primary Examiner—Joseph F. Peters, Jr.
Assistant Examiner—Donn McGiehan
Attorney, Agent, or Firm—Fulwider, Patton, Rieber, Lee & Utecht

[57] ABSTRACT

A foldable, portable bicycle in which the handlebar, its elongated post, the seat assembly, the pedal crank and the frame are foldable quickly and easily into a compact and regular-shaped package that is easily portable and storable, and are unfoldable with similar speed and ease into a safe, durable and comfortable bicycle that accommodates adults of normal size. The frame is designed with a low profile that is substantially the same in height and thickness as the dimensions of the wheels and their supports, and the handlebar and seat assemblies extend upwardly to normal height, but fold and collapse in novel ways, along with the pedals, to substantially within the confines outlined by the folded frame.

Unique quick-release latches are provided for the handlebar post, the seat post sections, the frame hinge and the pedal hinges, and the pedal cranks are specially designed for effective performance and easy, compact folding. Optional features include an enclosed front carrying compartment, a bracing cable permitting the seat post to be made of lighter materials, a rear carrying rack that extends the flat and low profile across the rear frame section, and a shopping cart mode in which the partially folded frame is held with the two bicycle wheels parallel, and an auxiliary wheel assembly stored in the mid-portion of the frame is swung out to form a 3-wheel cart with a carrying deck. Numerous additional detailed features are included in the disclosure.

5 Claims, 43 Drawing Figures

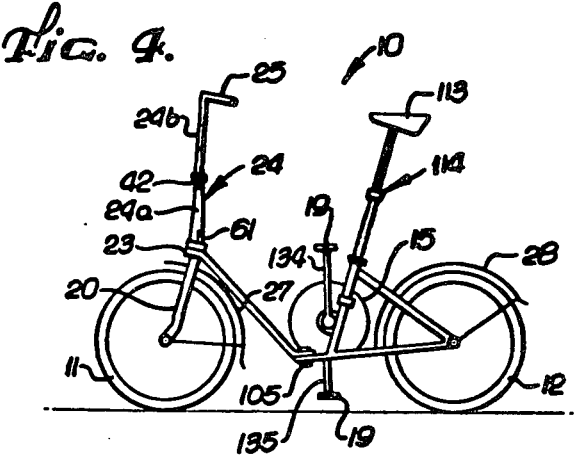
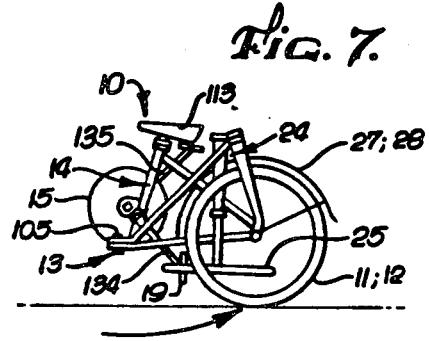
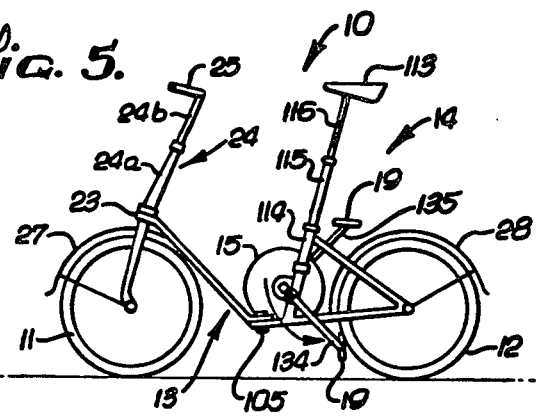
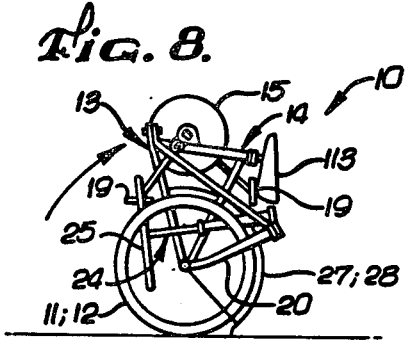
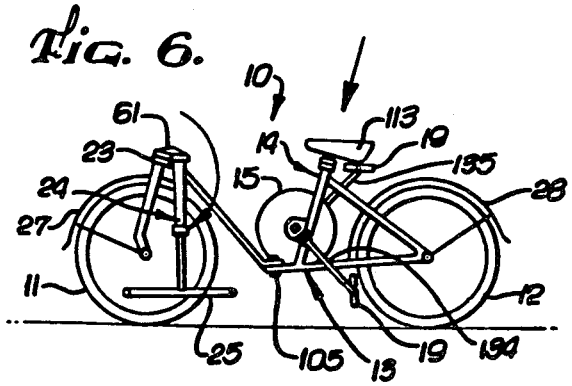
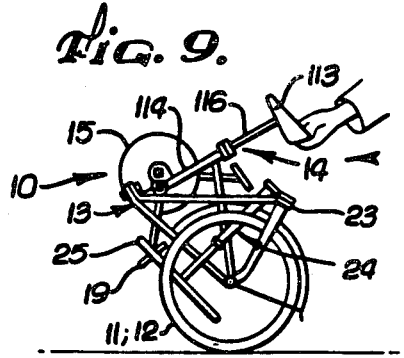

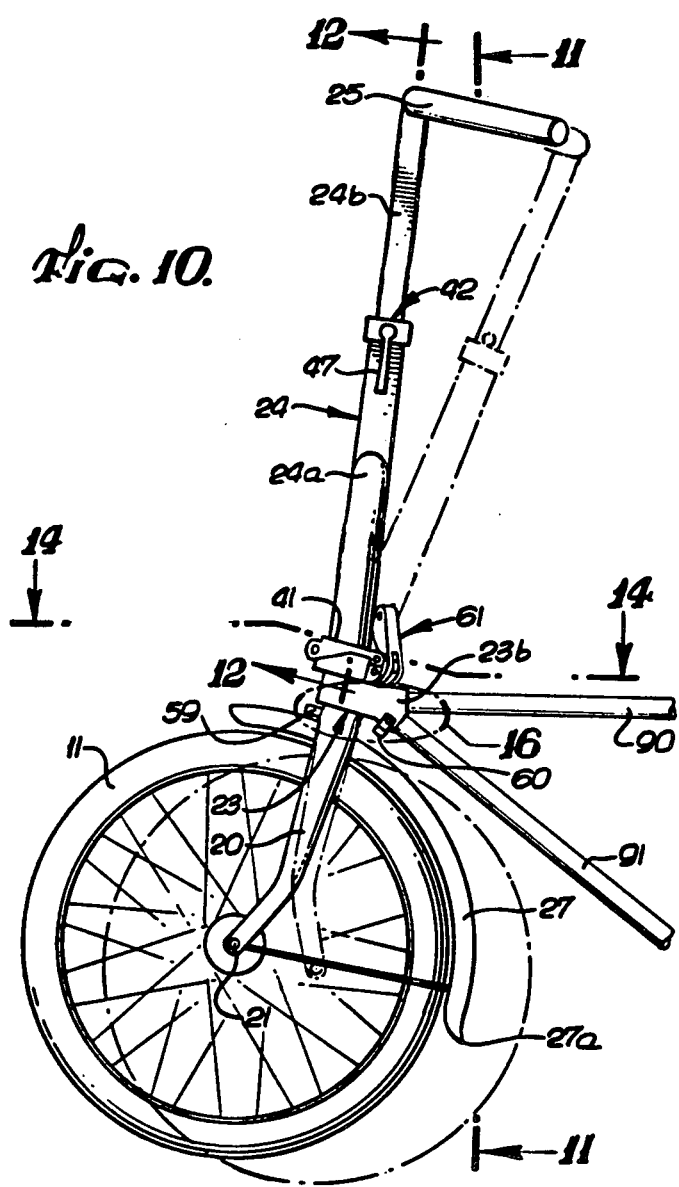
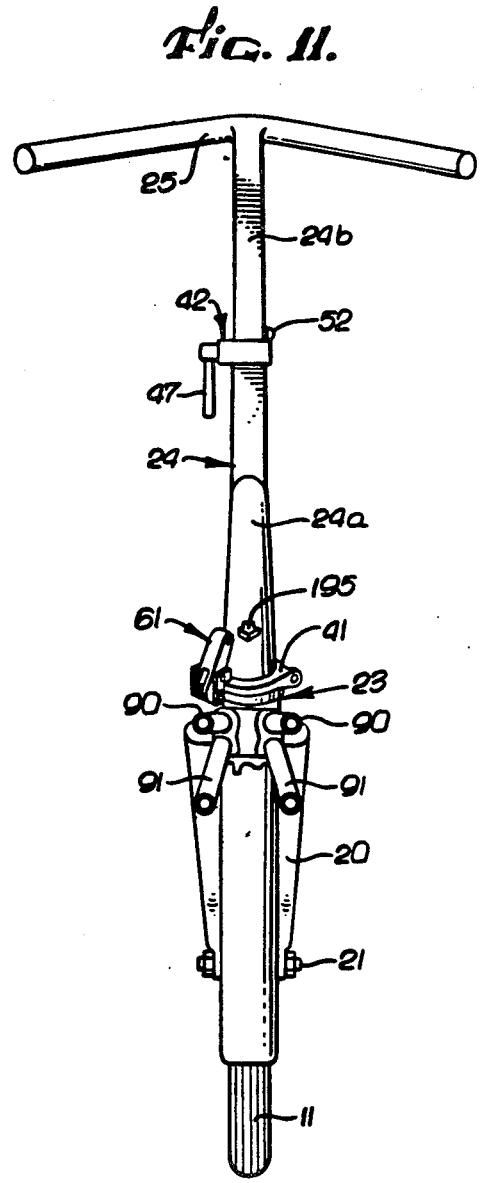
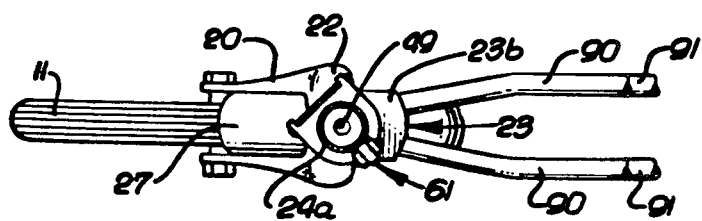
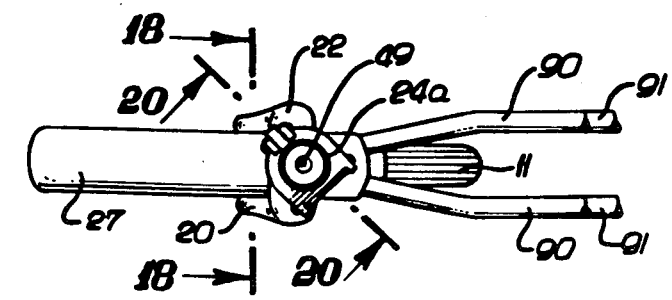

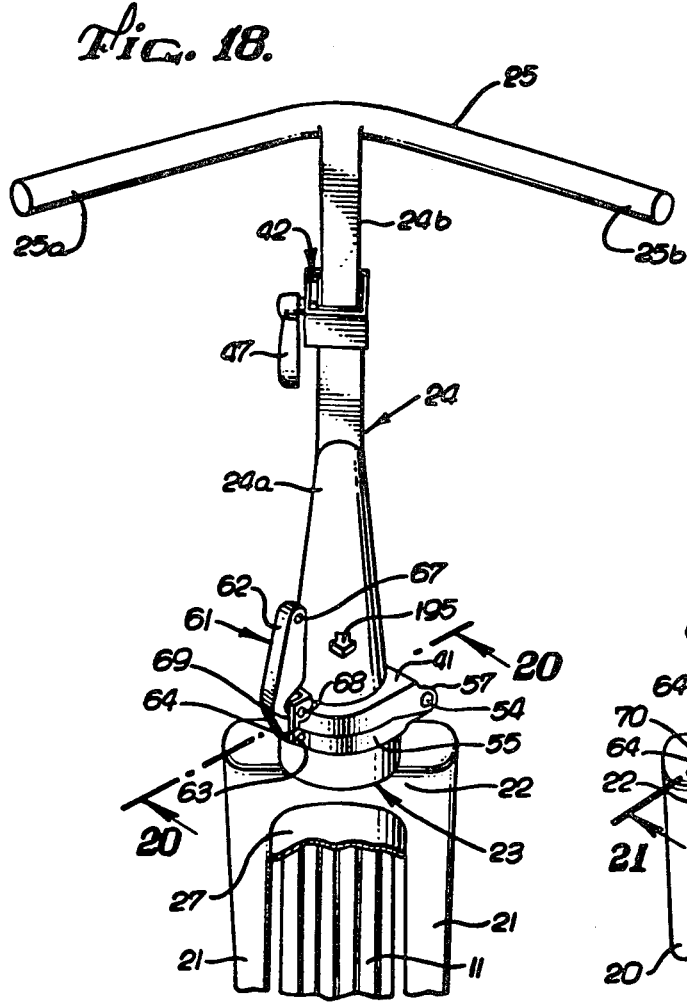
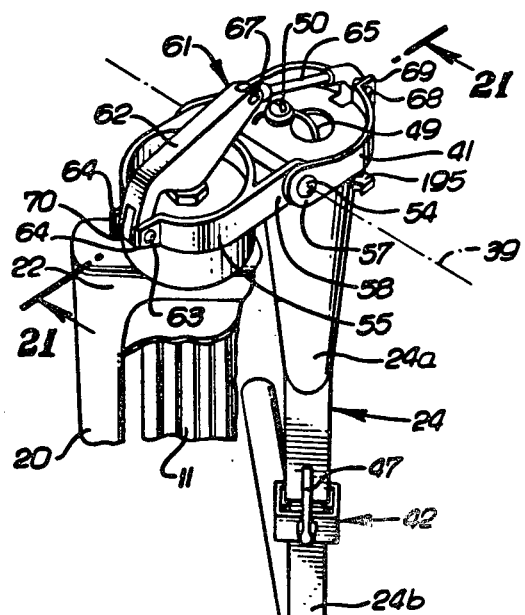
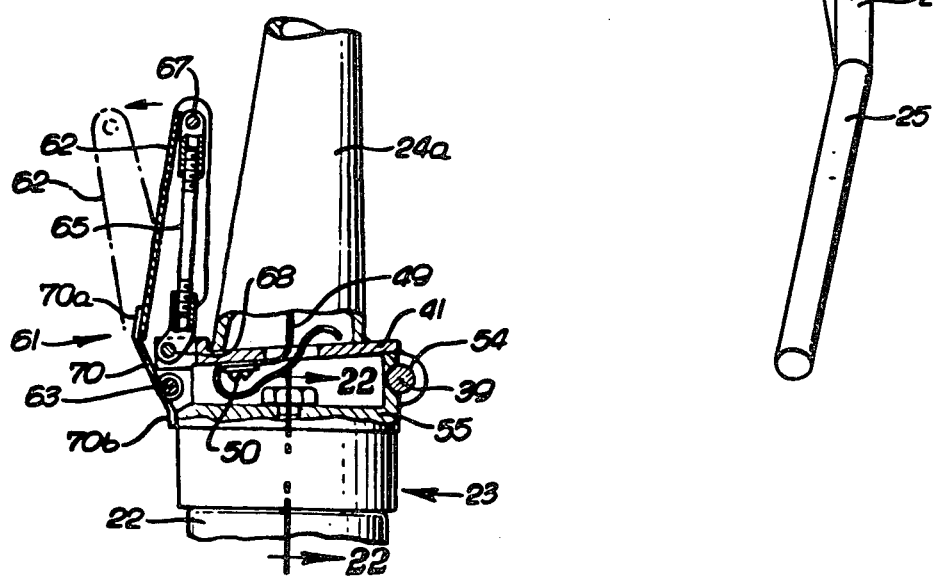

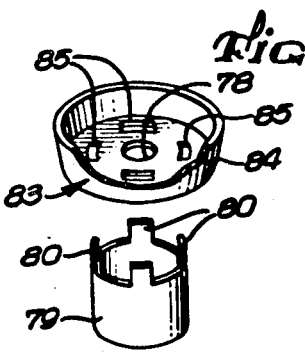
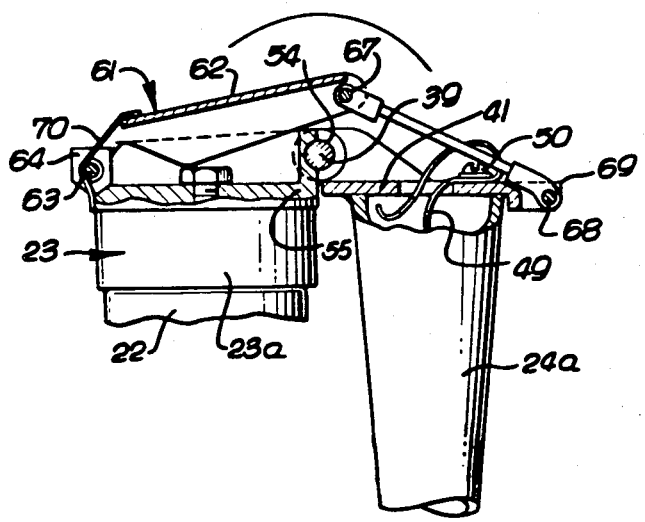
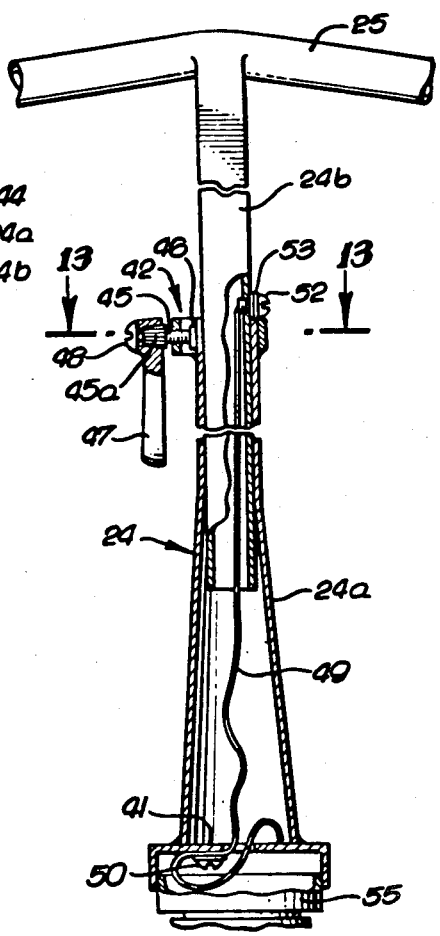
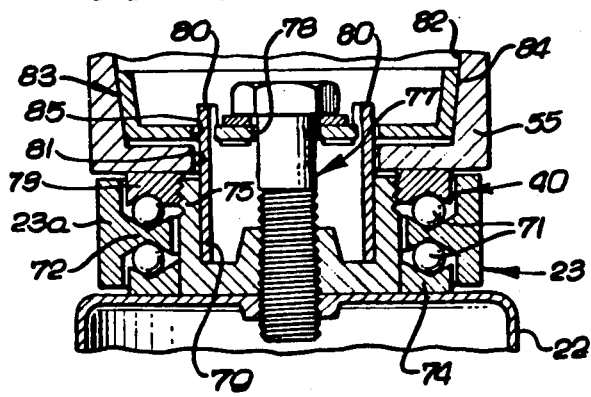
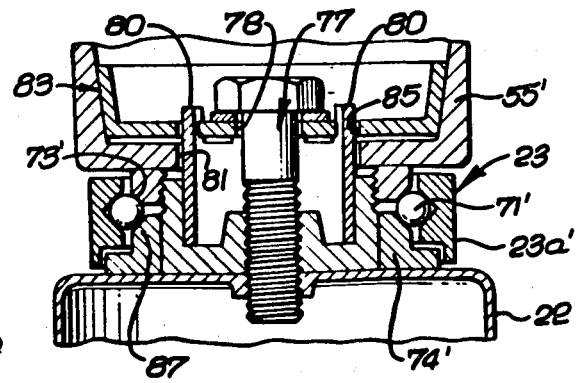

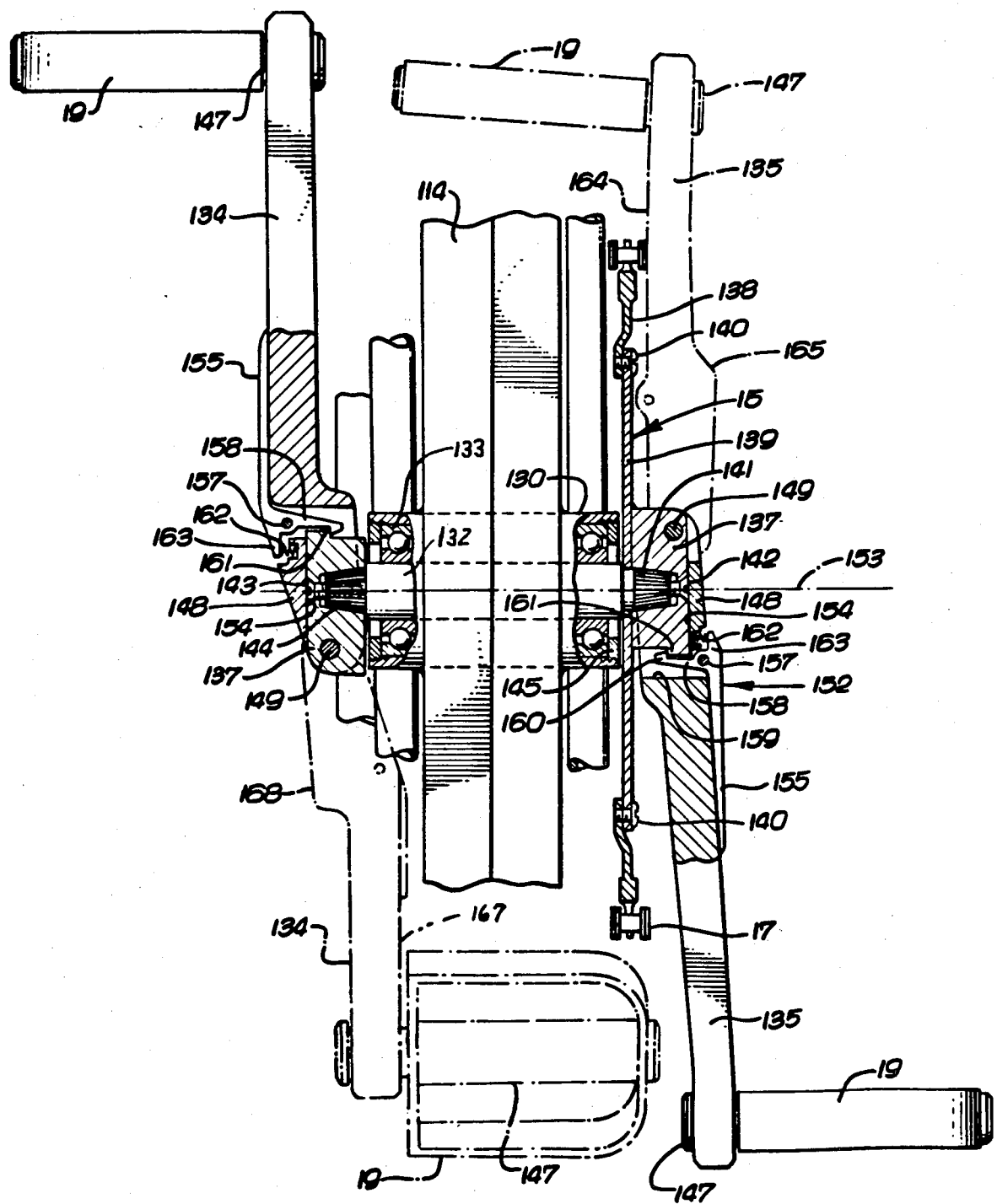

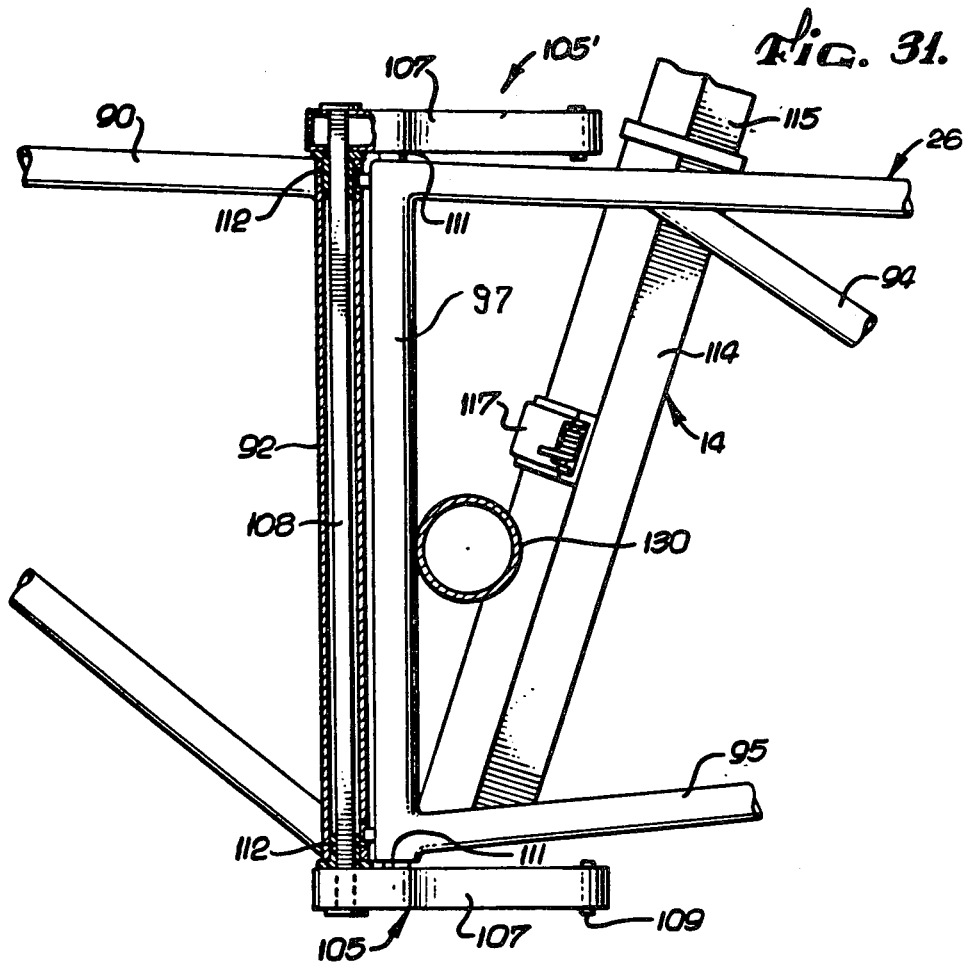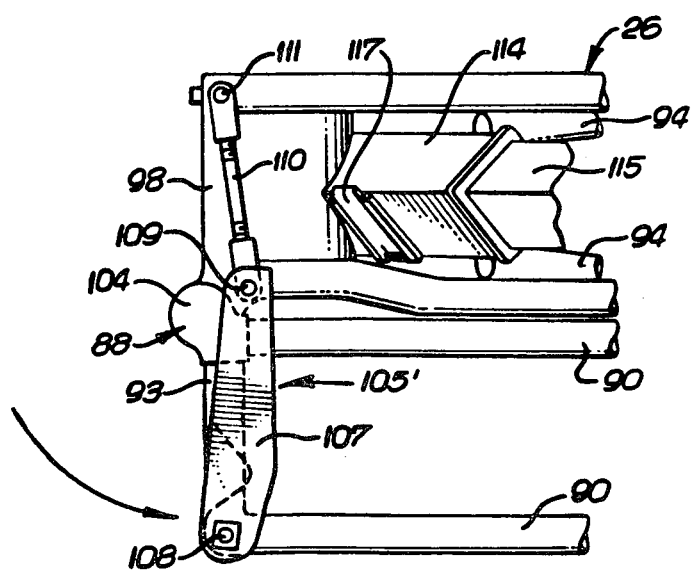

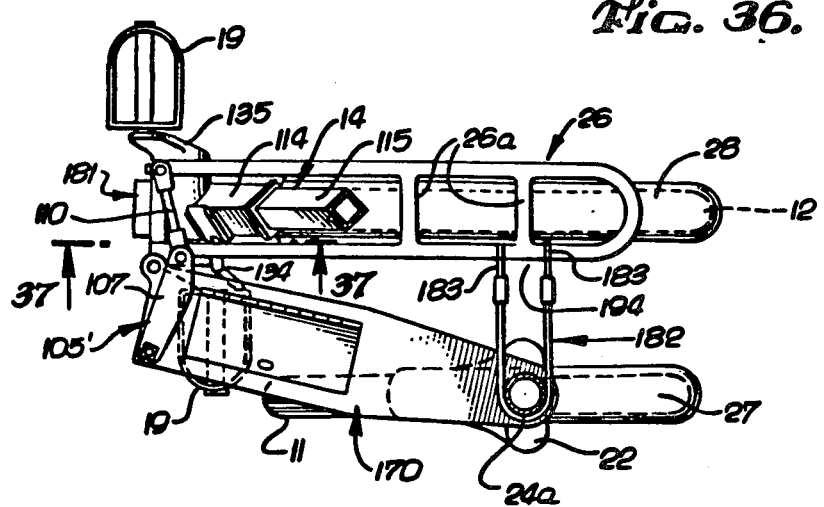
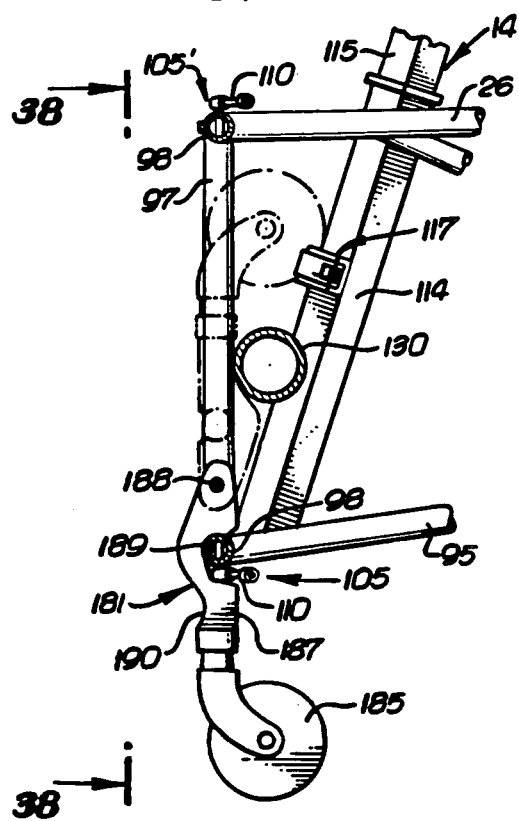

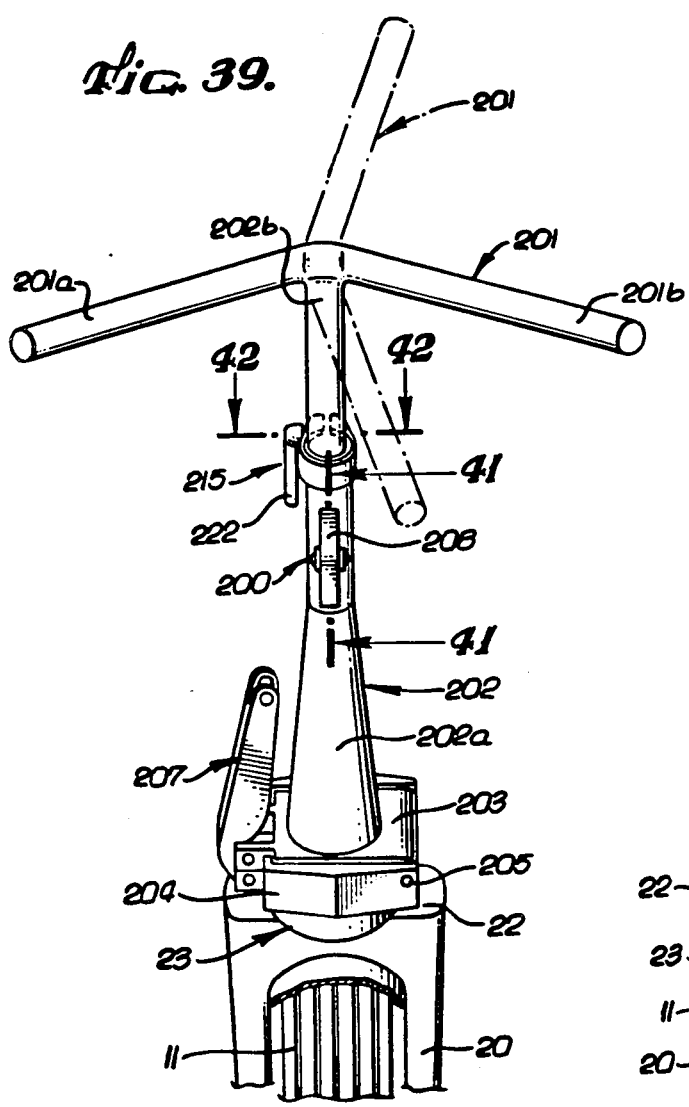
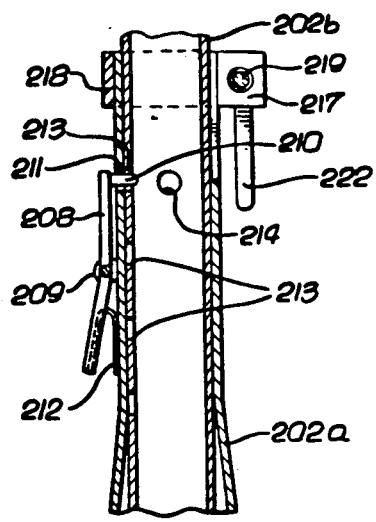
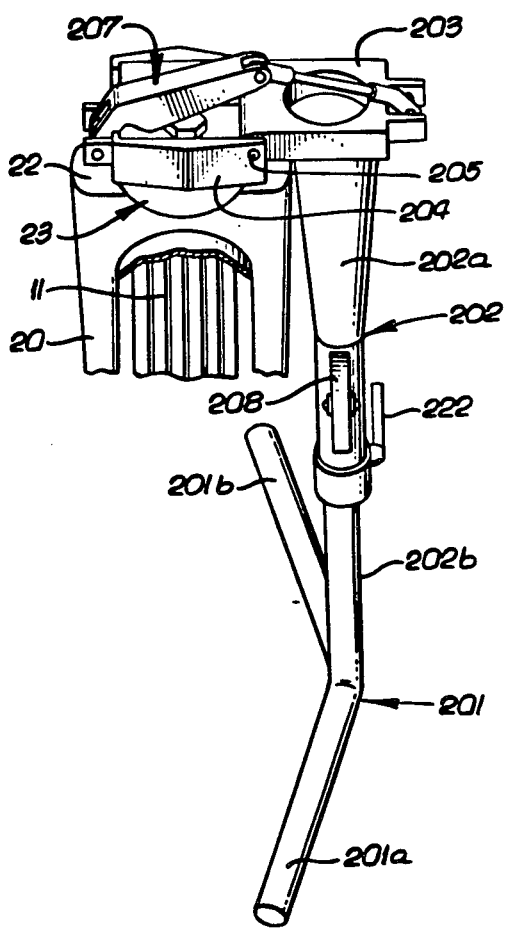
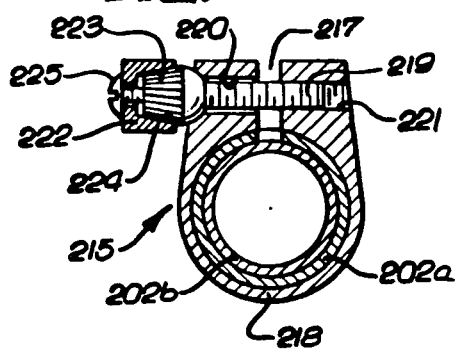

FOLDABLE AND PORTABLE VEHICLE

This is a division of application Ser. No. 233,624, filed Feb. 12, 1981, U.S. Pat. No. 4,433,852.

BACKGROUND OF THE INVENTION

This invention relates to foldable vehicles, and has particular reference to a bicycle that is capable of being reduced to a folded, portable package that can be carried by the user and stored in a relatively small space. Included in the broad category of vehicles to which the invention relates are collapsible and so-called "knockdown" vehicles, and vehicles which may be motor driven as well as driven by pedal-and-sprocket drives, and particularly motorized bicycles of the type known as mopeds.

For many years, efforts have been made to provide a practical foldable and portable bicycle for use in travel to and from bus stops, train stations, and the like, and to and from offices, grocery markets and other places of business, as well as for other typically short trips that can conveniently be made by bicycle, except for the problem of storage of the bicycle during travel on another vehicle, or during shopping, work, or other activity at the traveller's destination. Both convenience of travel and energy-saving economy are important motivating factors in this respect, and with the current increases in the cost of other forms of travel, and particularly in the cost of gasoline, these factors have become even more important than in the past.

The general objective in this field is to enable the cyclist to fold and collapse the bicycle quickly and easily into a compact and lightweight package that can be carried by the cyclist onto another vehicle, or into an office or shop, and stowed in available space such as under a seat, in a locker, or in some other relatively small space. Of course, it is also important for the cyclist to be able to unfold the bicycle and prepare it quickly and easily for use, and for the bicycle to perform satisfactorily in the unfolded condition, in terms of riding ease and comfort, safety, durability and other operating characteristics. In addition, it is important that the bicycle can be mass-produced at reasonable cost.

Many prior bicycles have been proposed in this general field, all designed to attempt to fulfill the need for a practical folding bicycle. One such bicycle is shown in this inventor's U.S. Pat. No. 4,067,589. Each of these bicycles, however, has shortcomings that prevent it from being the optimum bicycle of this type.

In the prior bicycles, including the one disclosed in the foregoing patent, the main components of the bicycle that can be folded and collapsed are the frame, the handlebar and steering assembly, the seat assembly, and in some cases the drive assembly, including the sprocket/pedal assembly. The wheels of the bicycle constitute the principal components that cannot practically be reduced in size, and thus typically are made relatively small as compared to conventional adult bicycles. To adapt a small-wheeled bicycle for use by an adult, the handlebar and steering assembly and the seat assembly extend upward to a conventional height. Except for the effect on "ride" on a rough surface, the relative disadvantages of the small wheels are not significant when the bicycle is equipped with a drive assembly providing a high front-to rear drive ratio.

The available foldable and collapsible bicycles suffer from a number of deficiencies, including inconvenient and time-consuming complexity in the folding and unfolding operations, excessive weight that is required in some designs for safe and durable construction, less-than-adequate rigidity for safe operation with other designs, and relative bulkiness or awkward shape in the folded condition with most designs.

The objective of the present invention is to provide a foldable and portable bicycle in which these characteristics are optimized so that the bicycle is quicker and easier to fold and unfold, is light in weight yet sturdy, durable and safe for normal operation, and is more compact, tightly folded and held, and convenient to handle in the folded condition for greater ease of storage and carrying, and as optional benefits, also has convenient storage elements for use during riding and is capable of being rolled as a cart both in the folded condition and in a partially folded condition in which the bicycle can be used to carry merchandise such as groceries. In addition, important objectives are to provide such a bicycle that can be mass-produced using conventional production technology to sell at a competitive price, and also can be adjusted to or provided in a full range of different riding configurations with respect to handlebar and seat positions, drive ratio and the like.

SUMMARY OF THE INVENTION

The present invention resides in the novel construction and interaction of the handlebar and steering assembly, the frame, and the sprocket/pedal assembly, preferably with an improved seat assembly of the general type shown in this inventor's prior patent, to produce a practical foldable and portable bicycle that more effectively accomplishes the objectives of such a bicycle in speed and convenience of folding and unfolding, compactness, weight, cost and operational characteristics. The bicycle has a low-profile folding frame that is substantially the same in height and thickness as the dimensions of the wheels and their supports, yet can maintain the basic "diamond" construction that is preferred for conventional bicycles, and all of the elements of the bicycle fold and collapse into the folded frame in novel ways, to lie, and be held, substantially within the confines of the folded frame, and also to open quickly and easily into, and be latched securely in, the normal operating condition.

More specifically, as illustrated by the presently preferred embodiments shown herein, the bicycle of the invention has an improved handlebar and steering assembly with a multi-section, longitudinally collapsible steering post which is hinged above a vertically compact steering bearing to fold into a position alongside the front wheel, about a hinge axis that is positioned to offset the steering post laterally from the wheel as an incident to the swinging of the post to the folded position, the handlebar also being turned from its normally transverse position into a generally front to rear position during folding, as a result of the hinge angle in the preferred embodiment. The handlebar is of relatively flat construction to lie compactly alongside the front wheel, and the combination of the longitudinally collapsible post, the vertically compact bearing, the hinge, and the flat handlebar makes it possible to reduce the height of the front portion of the bicycle in a quick and simple operation to only slightly more than the diameter of the wheel. Novel quick-release latch means effect secure locking of the post in the operating condition, and also contribute to the ease of folding, with easily accessible and operable but unobtrusive manual actuators, and the post also is designed to be positioned quickly and easily in selected angular and longitudinally extended positions.

The frame of the novel bicycle has generally triangular front and rear sections that are joined together by a hinge that is midway between the front and rear axles and connects the sections for swinging about an upright axis into a folded condition in which the sections are in side-by-side relation with the folded steering assembly preferably stored compactly between them. The upper extremities of both frame sections lie along or below an imaginary reference line that is immediately beneath the level of the vertically compact front steering bearing, and in a preferred embodiment, the upper sides of the sections are elongated flat sides lying along and generally defining this reference line, formed by a front "deck" on the front section and a rear carrying rack on the rear section.

While the specific frame construction may be varied, the presently preferred embodiment comprises generally triangular sections (apart from the carrying rack) having upright flat sides that abut against each other along the mid-frame hinge axis, the rear section tapering rearwardly to a rear wheel mount at axle level and the front section tapering forwardly to the front steering bearing that is spaced above axle level by an amount slightly greater than the radius of the front wheel. Both sections preferably are of an open frame or box-like construction, and are constructed of elongated tubular struts for high strength and light weight in the triangular construction. In one embodiment, the front section is enclosed in sheet material to provide a storage compartment, or is formed entirely of sheet material in an enclosed box-like form which provides suitable structural strength without reinforcing struts, while providing a convenient storage compartment. In all embodiments, the uppermost components of the frame, including the rear carrying rack, lie along and define a flat and generally horizontal upper extremity immediately above the level of the wheels, and the sides of the frame, when folded and when unfolded, are generally flat and without protruding parts, for a compact and easily handled package.

To reduce the overall length of the folded front section, the front wheel support, which normally is inclined forwardly at a conventional angle and has a conventional forward bend or "offset" at its lower end, is reversible, by rotation of the entire handlebar and steering assembly through one hundred and eighty degrees, reversing the offset and disposing the front side of the wheel beneath the front frame section, with the reversed rear side of the wheel closer to the rear to shorten the overall length by an amount determined by the amount of offset. Detent means are provided for latching the support snugly to the frame to fix the angular position of these parts during and after folding.

With front and rear frame sections having flat abutting sides, the mid-frame hinge is formed along one upright edge of a flat side and a selectively operable mid-frame latch is formed along the opposite upright edge to hold the frame securely but releasably in the unfolded operating condition. The preferred hinge construction is an elongated pin-and-sleeve combination on one side, and the preferred latch couples the front and rear sections on the other side, at least along the lower side of the frame, and has an easily accessible and operable but unobtrusive manual operator. With this frame and hinge arrangement, the forces acting on the frame during normal operation tend to close the joint at the top of the frame and reduce the forces acting on the latch at the top. The latch preferably has an upper latching component that is operated with the lower latching component for increased latching security.

The improved seat assembly is generally similar to the collapsible seat structure of this inventor's prior patent, with a multiple-section telescoping seat post, predetermination of extended and angular positions, and quick and easy movement of the seat from a collapsed position adjacent the upper reference line of the frame to an extended position at the proper height for the cyclist. The telescoping post sections are of a non-circular cross-section that is oriented to provide optimum firmness of fit under the weight of a cyclist, and improved and simplified quick-operating latches are provided for the multiple-section post. When the seat assembly is partially collapsed, it serves as a convenient handle for towing or pushing the folded bicycle in an upright position.

To reduce the usual sprocket/pedal assembly to a more compact form, the two pedals are supported in their normal laterally outwardly projecting positions on two generally radial cranks that have inner end portions that are pivotally mounted on the opposite ends of an axle for the sprocket, and are latched for quick and easy release and swinging into laterally inwardly projecting folded positions in which the pedals tuck into the folded frame and are nested and latched in the frame. Each of the cranks has an inner end portion that extends across the sprocket axis and interfits with a drive connector on the axle having driving abutments that are normally engaged with opposed abutments on the crank, and a pivot is provided at the inner end between the crank and the drive connector so that the crank is elongated as it swings from its normal position to an oppositely extending position in which the pedal projects inwardly rather than outwardly.

In addition, the outer end portions of the cranks are disposed at angles with the inner end portions, and thus are angularly offset from true radial positions, to swing into compact folding positions other than positions that are directly opposite (that is, 180 degrees away from) the normal positions. Preferably, the outer end portion of at least the crank that lies alongside the sprocket also is inclined laterally outwardly away from the sprocket, as well as angularly from a true radial position. The outward incline positions the pedal conventionally, with normal operating clearance, and, when reversed during folding, positions the crank closer to the sprocket for folded compactness. A lateral offset is provided for the other crank, for similar folded compactness.

Latching of the pedals into the frame is accomplished most simply by engaging the pedals with an interference fit over elements of the rear frame section, using the inherent resilience of the structures to permit latching engagement and disengagement. The pedals and the engaging elements are spaced so that upon reversal of the cranks, the now-inwardly extending pedals pass across and abut against a frame element, preferably a lower strut of the rear section on one side and an upper strut on the other. Unobtrusive quick-release latches are conveniently actuatable as an incident to grasping of the cranks to move them to their folded positions, and relatch with an effective snap action as an incident to the return of the cranks to their normal positions.

These novel assemblies make it possible to produce a lightweight foldable bicycle that is highly effective for its intended purposes, for example, using preferred sixteen-inch wheels and weighing on the order of twenty to twenty-four pounds, capable of being folded or unfolded in ten to fifteen seconds, to and from a size that will fit conveniently under a bus seat or in a locker, with all of the normally protruding components folded, tucked and securely held in the folded frame. Of course, wheels of other sizes may be used, and the features of the invention will apply to produce an optimum folded bicycle with a given wheel size.

Accordingly, the folded bicycle forms a tight, generally flat-sided package without objectionable protruding or loose parts, with the two wheels side by side at one end of the package and the adjacent ends of the frame sections side by side at the opposite end of the package. This permits convenient rolling of the folded bicycle on the wheels, using the hinged frame struts or the seat as a handle, and also makes it possible to stand the package in an upright position on the wheels, the wheel fenders having ends that are especially positioned to provide a four-point base.

More detailed features include the novel design of the preferred latches for the steering post hinge and the frame, with actuators that operate quickly and easily during both latching and unlatching, hold the latched components very securely when in the latched condition. Similarly, the latches for the telescoping sections of the steering post and the seat posts are of novel designs for secure latching, ease of operation, and unobtrusive positioning on the bicycle. All of the latches are in compact, unobtrusive and tightly held positions both when latched and when unlatched.

Additional optional features include a special seat-bracing cable for reinforcing the seat structure for heavy riders, and permitting the use of lighter materials for the seat post, the cable being attached at one end to the seat assembly above the frame and extending forwardly to the front end portion of the frame. The cable preferably extends into the front section and then reversely to the mid-frame hinge, where it is wrapped around separable portions of the two frame sections to reinforce the frame in use and to be taken up to some extent as the frame is folded. The other cables typically provided for conventional accessories, including brakes and a gear selector, are positioned to be folded with the bicycle into securely held and unobtrusive positions, in all embodiments.

Another optional feature is the provision of an auxiliary wheel assembly that is extendable from the folded frame to convert the bicycle into a three-wheeled shopping cart, with the seat on the handlebar serving as a towing handle, and the front deck and the rear carrying rack providing a carrying surface for bags and parcels. The detent means for holding the frame in tightly folded condition include a second set of detents for holding the front wheel parallel to the rear wheel when the frame is in a spread, shallow "V" configuration, with a pedal crank unfolded between them to hold them partially apart. An elastic tie draws them toward each other and against the pedal crank. The auxiliary wheel also provides a convenient three-wheel support for rolling the fully folded bicycle, using the partially extended seat as a handle.

In an alternative embodiment of the steering post and its hinge, a steering post extension section is rotatable in a base section to accomplish the turning of the handlebar into a front-to-rear position during folding, and the steering post hinge is positioned along one lateral side of the post to offset the post to one side of the wheel without turning of the handlebar by the hinge. Detent means are provided for latching the extension section in different angular positions for normal operation and for folding, and also in different extended positions. A novel quick-release clamp holds the rotatable extension section securely in its selected position. This embodiment provides an alternative to the preferred embodiment, accomplishing the turning of the handlebar in a less direct fashion.

Other detailed features and advantages of the invention will become apparent from the accompanying drawings, taken in conjunction with the detailed description of the presently preferred embodiments of the invention.

BRIEF DESCRIPTION OF THE DRAWINGS

FIG. 4 is a schematic side elevational view of the bicycle of FIGS. 1 and 2, shown in the unfolded, operational condition with structural elements simplified and removed for clarity of illustration;

FIG. 5 is a view similar to FIG. 4 illustrating initial steps in folding—collapsing the front post, reversing the steering assembly, and folding the pedal cranks;

FIG. 6 is a view similar to FIG. 5 illustrating further steps in folding—folding over the steering post and handlebar, and collapsing the seat structure;

FIG. 7 is a view similar to FIG. 6 illustrating a further step in folding—swinging the two frame sections into side-by-side relation;

FIG. 8 is a view similar to FIG. 7 showing the folded bicycle tilted into a standing position;

FIG. 9 is a view similar to FIG. 8 showing the folded bicycle in a pushing or towing position;

FIG. 10 is a fragmentary side elevational view of part of the front portion of the bicycle of FIGS. 1 and 2, on an enlarged scale, with some parts removed and with the reversed position of the steering assembly indicated in broken lines;

FIG. 11 is a cross-sectional and elevational view taken generally along line 11—11 of FIG. 10;

FIG. 12 (on sheet 6 of the drawings) is a fragmentary cross-sectional view taken generally along line 12—12 of FIG. 10, with some parts shown in side elevation;

FIG. 13 is an enlarged cross-sectional view taken along line 13—13 of FIG. 12;

FIG. 14 (on sheet 4 of the drawings) is a fragmentary cross-sectional view taken generally along line 14—14 of FIG. 10;

FIG. 15 is a fragmentary cross-section similar to FIG. 14 but showing the front wheel in the reversed position;

FIG. 18 (sheet 5 of the drawings) is an enlarged fragmentary cross-sectional view taken substantially along line 18—18 of FIG. 15;

FIG. 19 is a view similar to FIG. 18 with the handlebar and steering post folded over, and showing details of the front hinge latch in the unlatched condition;

FIG. 20 is an enlarged fragmentary cross-sectional view taken substantially along line 20—20 of FIG. 15, shown partly in side elevation, and with an intermediate condition of the front hinge latch shown in broken lines;

FIG. 21 is an enlarged fragmentary cross-sectional view taken generally along line 21—21 of FIG. 19, and shown partly in side elevation;

FIG. 22 is an enlarged fragmentary cross-sectional view taken through the steering bearing generally along line 22—22 of FIG. 20 and shown in modified form with added wheel-alignment elements;

FIG. 23 is an isolated and exploded perspective view, on a reduced scale, of the wheel-alignment elements, one element being shown with a portion of the sidewall broken away;

FIG. 24 is a view similar to FIG. 22 showing an alternative embodiment of the steering bearing;

FIG. 28 is a further enlarged fragmentary view taken generally along line 28—28 of FIG. 25 with some parts shown in cross-section and with the folded positions of the cranks and pedals shown in broken lines;

FIG. 31 is a fragmentary cross-sectional view taken generally along line 31—31 of FIG. 30;

FIG. 32 is a fragmentary view of parts in FIG. 30, but after the mid-frame latch has been released and the frame has been folded;

FIG. 36 is a cross-sectional view of the bicycle of FIG. 33 in a partially folded shopping cart mode, taken in a horizontal plane above the rear carrying rack and the front deck, generally along line 36—36 of FIG. 38, with an elastic tie and auxiliary wheel assembly added, and with the bracing cable removed;

FIG. 37 is a fragmentary cross-sectional view on an enlarged scale taken substantially along line 37—37 of FIG. 36;

FIG. 38 is a fragmentary elevational view taken in the direction of the arrows 38 in FIG. 37.

FIG. 39 is a view similar to FIG. 18 showing an alternative embodiment of the steering post and hinge, with a folding position of the handlebar shown in broken lines;

FIG. 40 is a view similar to FIG. 19 showing a portion of the alternative embodiment of FIG. 39, with the steering post folded over;

FIG. 41 is an enlarged fragmentary cross-sectional view taken substantially along line 41—41 of FIG. 39, with the steering post longitudinally collapsed and in the normal operating position;

FIG. 42 is an enlarged fragmentary cross-sectional view taken substantially along line 42—42 of FIG. 39.

DETAILED DESCRIPTION OF THE FIRST EMBODIMENT

Figure 3:
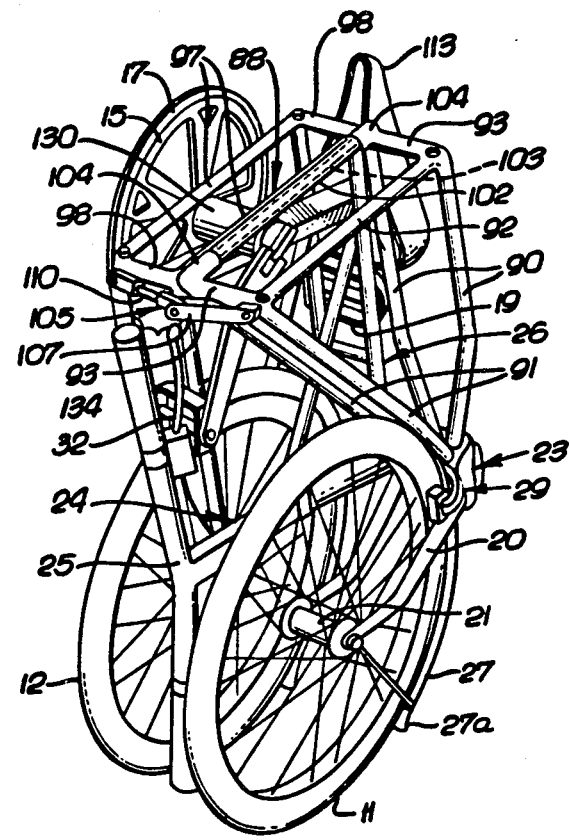
FIG. 3 is a perspective view of the bicycle of FIGS. 1 and 2, shown on a slightly enlarged scale in the folded condition of the bicycle.
Figure 43:
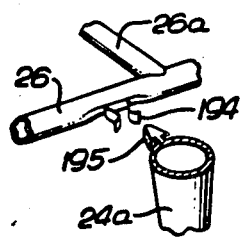
FIG. 43 (sheet 2 of the drawings) is an enlarged fragmentary exploded perspective view of portions of the frame and the steering post, with catch means thereon.

As shown in the drawings for purposes of illustration, the invention is embodied in a foldable and portable bicycle, indicated generally by the reference number 10, of the type that is adapted to be reduced to a compact package, as shown in FIG. 3, for ease of carrying and storage. Bicycles of this general type are useful in riding to and from modes of public transportation, such as buses and trains on which the folded bicycle can be carried or stowed in available space during the ride, and also in riding to and from commercial establishments and places of employment, where the bicycle also can be folded, carried into a building, and stored until needed for the return trip.

Figure 1:
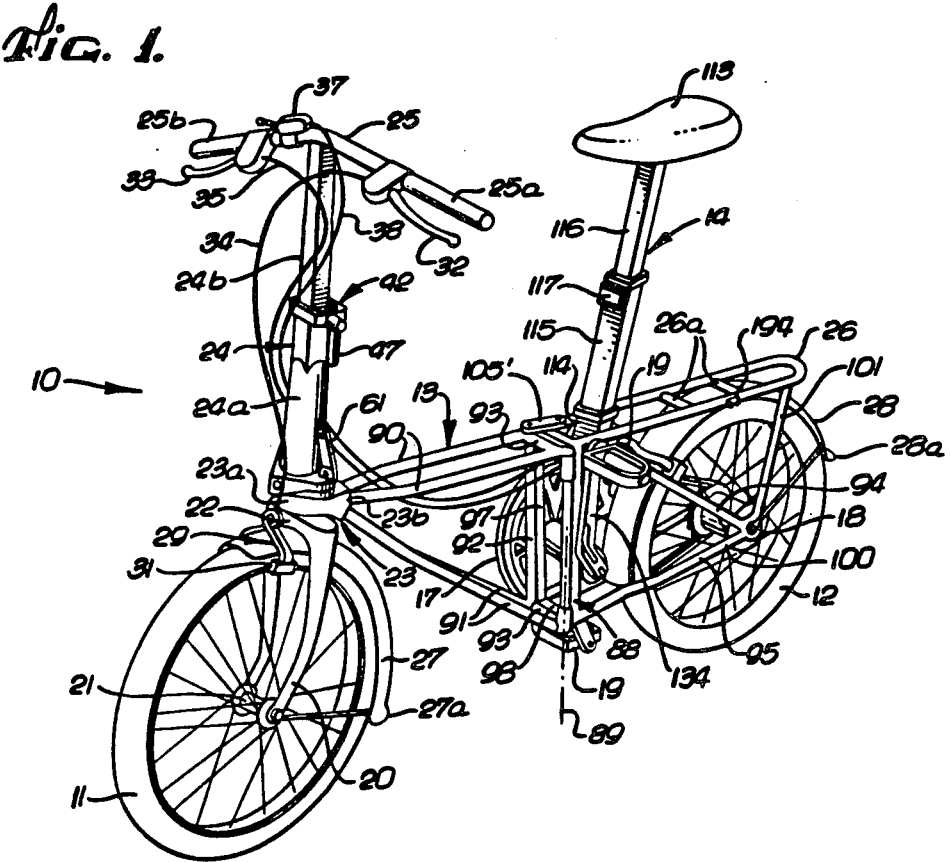
FIG. 1 is a perspective view of a foldable and portable bicycle embodying the novel features of the present invention, shown in the unfolded operating condition with a rear carrying rack which is a preferred optional feature of the invention.
Figure 2:
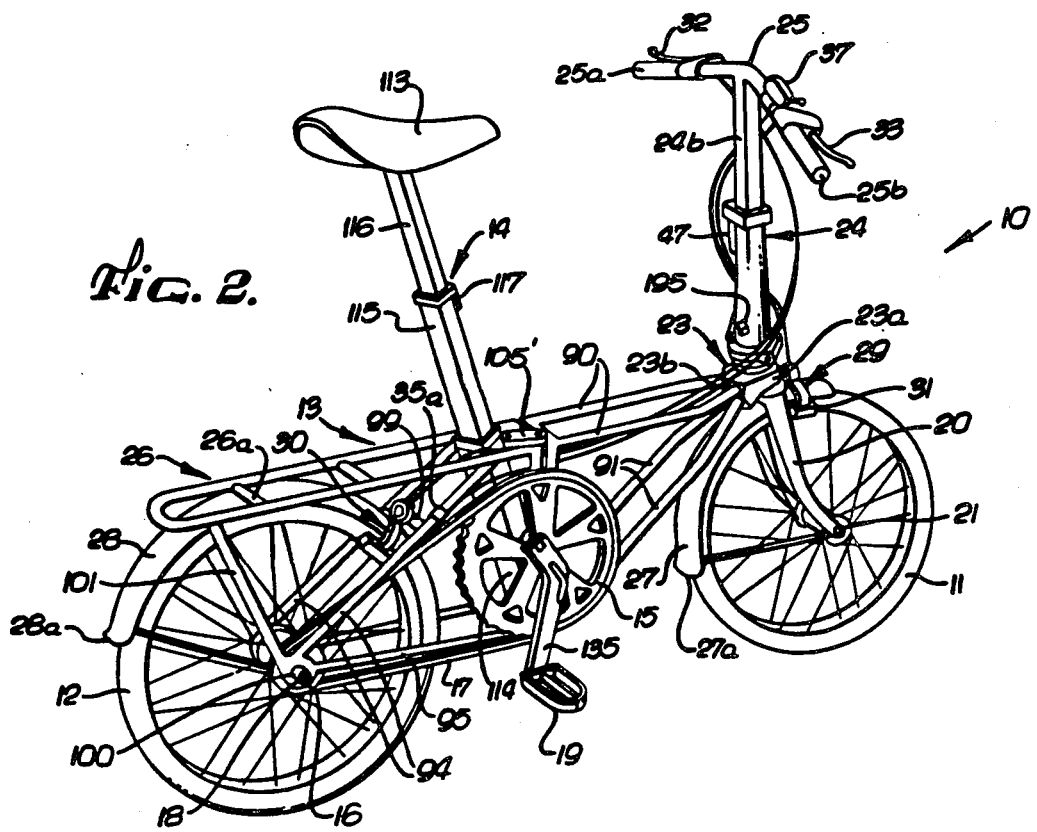
FIG. 2 is a perspective view similar to FIG. 1 but taken from the opposite side of the bicycle.

As can be seen in FIGS. 1 and 2, the bicycle 10 comprises, in general, the usual main components and assemblies including front and rear wheels 11 and 12, a frame indicated generally by the reference number 13, a seat assembly 14 mounted in the mid-portion of the frame, a drive assembly including front and rear sprockets 15 and 16, sometimes called "chainwheels", connected by an endless chain 17 to drive the rear wheel 12 about a rear axle 18 as the front sprocket is turned by two pedals 19, and a handlebar and steering assembly for turning the front wheel 11. This assembly includes a front wheel support of the usual "fork" type having two depending prongs 20 that are disposed on opposite sides of the wheel and have spaced lower ends forming a front wheel "drop-out" in which a front axle 21 is mounted. The upper end or "crown" 22 of the fork is rotatably connected through a wheel mount or "headtube" 23 to a post 24 for the handlebar 25, the wheel mount corresponding in function to the "headtube" of a conventional bicycle.

Optional components that preferably are included as conventional and useful elements of a bicycle are a carrying rack 26 above the rear wheel, arcuate front and rear fenders 27 and 28 which are mounted on the frame 13 to overlie the front and rear wheels 11 and 12, and front and rear caliper brake mechanisms 29 and 30 on the front of the fork crown 22 and on the frame above the rear wheel, having lever-supported brake pads 31 for frictionally clamping the sides of the wheels. The brake mechanisms are actuated by hand levers 32 and 33 supported near the opposite ends of the handlebar 25 and connected to the brake mechanisms by cables 34 and 35, the rear brake cable being routed along the frame and fastened thereto by a clip 35a (FIG. 2). Also provided in the illustrative bicycle 10, for ease of pedaling under a variety of conditions, is a multi-speed transmission (not shown in detail) with a manual gear selector 37 that is mounted on the handlebar and connected to the transmission by a cable 38. Other conventional bicycle accessories (not shown) also may be added, as desired.

It has been proposed in the past to fold bicycles of the foregoing general character, as shown by the aforementioned patent, including folding and collapsing of the frame, the steering assembly, the seat assembly and the pedals in various ways and combinations that reduce the folded size of the bicycle with varying degrees of success. This invention contemplates, in its broader aspects, an improved foldable bicycle which, as a result of the novel construction of a folding handlebar and steering assembly and its interaction with a novel folding frame, augmented by improved collapsible seat assembly and folding sprocket/pedal assembly, optimizes the advantages and convenience of the bicycle. The advantages and convenience are enhanced by special latches for quick and easy operation in both latching and unlatching, and by other more detailed aspects of the invention.

The improved handlebar and steering assembly has a muliple section, longitudinally collapsible steering post 24 that is extendable to a length greater than the front wheel diameter and collapsible to a length approximately the same as the wheel diameter, and this post is hinged on the front wheel mount 23 to fold about a hinge axis 39 that is located immediately above the front wheel 11, into a position alongside the front wheel while turning the handlebar 25 from its normal transverse position (FIGS. 1, 2 and 4) into a generally front-to-rear position (FIGS. 6 and 19) alongside the wheel. The handlebar is relatively flat in shape with a relatively small amount of front-to-rear displacement in its normal operating position, and thus lies relatively flatly against the wheel when folded, for eventual compact positioning within the folded frame 13. Thus, all of the steering structure above the front wheel mount is disposed beside the wheel, and the front wheel mount, and a steering bearing 40 therein, are made vertically compact to reduce the height of the folded front portion of the bicycle virtually to the diameter of the front wheel.

More specifically, the steering post 24 comprises a base section 24a which preferably is relatively broad adjacent its lower end and tapers upwardly, and an extension section 24b that telescopes with the base section and extends upwardly to the handlebar 25, which is secured to the extension section substantially perpendicular to it, for example, by welding. The two sections of the post are non-circular in cross-section, herein square, to hold the sections slidably in a fixed angular relationship. On the lower end of the base section is a mounting element 41, herein a flanged transverse base plate.

To hold the post 24 with its two sections 24a and 24b in a selected extended position, a novel quick-release clamp 42 (see FIGS. 12 and 13) is provided around the upper end of the base section 24a, to lock the sections together. For this purpose, the upper end portion of the base section is made flexible on one side by a pair of longitudinal slots 43 (FIG. 13), and the illustrative clamp comprises a collar 44 that is disposed around the upper end of the base section with a screw 45 that is threaded through the collar and abuts against the flexible upper end portion of the base section, preferably with a wide bearing pad 46 on its inner end pressing against the flexible side of the base section. On the outer end of the screw 45 is an actuator in the form of a lever 47 for tightening the screw against the base section, and thus constricting the flexible upper end portion around the extension section 24b. The lever should be maintained in an out-of-the way position when the clamp is tightened, preferably depending along one side as shown in FIG. 1, and to insure that such positioning can be maintained, despite variations that occur in use, the lever is connected to the screw 45 by a splined and outwardly tapered head 45a, and a screw fastener 48 that is threaded into the head through the lever to press a tapered and splined socket or seat therein tightly onto the splined head in a selectively adjustable angular position.

Rapid location of the post 24 in a selected extended position during unfolding is facilitated by an adjustable limiting device shown in FIG. 12, in the form of a flexible cable 49 that is anchored at one end on the base section 24a and attached at the other end to the extension section 24b. As shown in FIG. 12, the lower end of the cable herein is attached to the base plate 41 by a lower anchor screw 50 and extends upwardly through a hole in the plate, and the upper end portion extends upwardly through the extension section 24b and is secured to an upper anchor screw 52 that is threaded into the side of the extension section above the base section. The length of cable between the upper and lower anchor screws is adjustable to select an extended length for the post 24, and the upper anchor screw forms a stop for abutting against the upper end of the base section and limiting the longitudinal telescoping of the extension section into the base section, thus determining the collapsed length of the post. A stop washer 53 preferably is provided on the upper anchor screw for engagement with the base section.

As can be seen in FIGS. 1 and 2, the illustrative handlebar 25 is generally in the shape of a shallow inverted "V", having a central apex to which the extension section 24b is welded and opposite end portions 25a and 25b forming hand grips to be grasped by the rider. These end portions are inclined somewhat downwardly and to the rear from the apex, but it is important for optimum compactness to limit the amount of front-to-rear displacement of the handlebars. The downward and rearward incline shown herein provides a comfortable angle for the cyclist, and also provides clearance in the folded bicycle for accommodating the brake actuators 32 and 33.

The height of the handlebar in the unfolded condition is a matter of personal preference, and is adjustable over a wide range, the illustrative handlebar being adjustable to almost twice the length of the base section 24a of the post. It can be seen in FIG. 12, however, that the extension section can be made even longer, for a greater maximum length. The length illustrated in FIGS. 1, 2 and 12 positions the handlebar in a relatively low, "racing" position preferred by many cyclists, requiring no further collapse during folding of the bicycle. A greater extended length, shown in FIG. 4, is preferred by others, for riding in a more erect position, from which the handlebar should be lowered as a first step as the bicycle is being folded. With the quick release latch shown herein, this requires only a second or two in the folding and unfolding operations.

The handlebar and steering assembly are supported on the front end of the frame 13 on the wheel mount 23 which has an arcuate sidewall 23a that surrounds the steering bearing 40 of the bicycle. The hinge axis 39 for the steering post 24 is defined by a hinge pin 54 that connects the base plate 41 to a cup-like hinge base 55 (see FIGS. 18 through 24) that is connected through the bearing to the crown 22 of front wheel fork 20. The hinge pin 54 is disposed on one side of the hinge base, and extends through interfitting and overlapping wings 57 and 58 on corresponding sides of the two bases, with a head on each end holding the pin in place so that the base plate of the steering post 24 is swingable about the hinge axis 39 defined by the pin 54 between the operating position shown in FIG. 18 and the folded position shown in FIG. 19.

With the hinge axis 39 offset to one side of the post 24, the post is transferred during folding from its normal position in which it is laterally centered over the front wheel mount 23 and the wheel 11, to a laterally offset position generally in a plane that lies alongside the wheel. In addition, the location and attitude of the post hinge can serve to offset the post longitudinally from the fork prongs 20, to lie closer to the side of the wheel, and also can serve to turn the handlebar from its normal laterally projecting position to a generally front-to-rear position as an incident to the folding. This turning function is included in the preferred embodiments of the invention, but it is to be noted that the extension section 24b of the post can be made rotatable in the base section 24a, adding another clamping and positioning operation to the unfolding procedure.

In the preferred embodiment, the hinge pin 54 is inclined at an angle of approximately forty-five degrees relative to the plane of the wheel to extend obliquely across the base of the post, from one lateral side to the front side (see FIG. 14) and also is tilted upwardly toward the front, at an angle of about 15 to 20 degrees from horizontal (see FIG. 2). The opposed edges of the base plate 41 and the hinge base 55 preferably lie along an inclined plane that includes the tilted hinge axis 39, the base plate being inclined to converge slightly toward the hinge base as shown in FIG. 20. The compound angle of the hinge axis 39 results in tilting of the post 24 during folding, toward the front portion of the front wheel and beyond the depending prong 20 of the fork, while turning the handlebar generally into a front-to-rear attitude in a vertical plane alongside the wheel.

As shown schematically in FIGS. 5, 6 and 15, it is preferred to turn the wheel one hundred and eighty degrees to a folding position before folding the post and handlebars, to reduce the overall length before folding, the fork having a conventional forward bend or "offset" near its lower end which offsets the wheel to the front. This offset is reversed when the wheel is reversed, thus saving the amount of the offset in the length of the bicycle. Reversal of the wheel may be eliminated, in which case the location and angle of the hinge should be adjusted to the different circumstances, which also affect the location of the mid-frame hinge.

Figure 16:
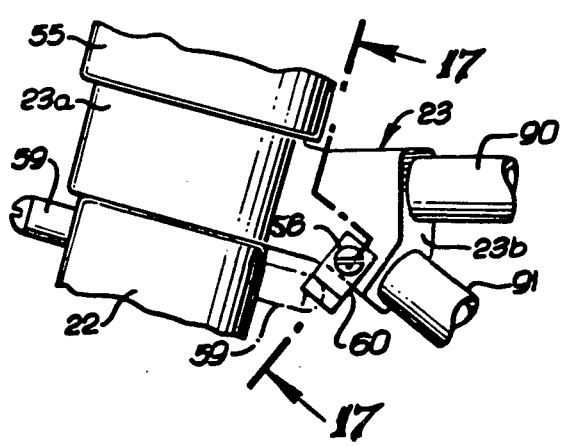
FIG. 16 (sheet 2 of the drawings) is an enlarged fragmentary side elevation taken generally within the arc 16 of FIG. 10, with a detent pin shown in full in a normal position and in broken lines in a reversed position.
Figure 17:
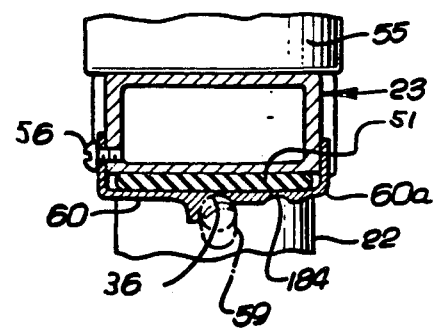
FIG. 17 is a fragmentary cross-section taken generally along line 17—17 of FIG. 16 with the detent pin in the reversed position.

In this instance, provision is made for limiting the turning of the steering assembly to a folding position that is approximately one hundred and eighty degrees from the forward position, and detaining the steering assembly releasably in this position to avoid looseness when the frame 13 is folded and to assume a parallel relationship with the rear wheel for easy pushing or towing. For this purpose, interacting detent means are provided on the crown 22 of the fork and on the non-rotating wheel mount 23, to be releasably engaged when the steering assembly reaches the reversed position for folding. As shown in FIGS. 16 and 17, these means include a normally forwardly projecting pin 59 on the front side of the crown, and a flexible detent strap 60 fastened by a screw 61 to the underside of the wheel mount 23, in the path of the pin during turning of the wheel. The strap is positioned to engage the pin as it reaches the right end (FIG. 17), and is yieldable upwardly under the camming action of the pin and the curved end 60a of the strap, to permit the pin to pass along the strap to a detent notch 62 in which the pin is seated when the steering assembly is reversed. A resilient pad 64 confined between the strap and the wheel mount provides for resilient yielding of the strap.

Although the prongs 22 of the wheel supporting fork are inclined downwardly and forwardly at a conventional angle from the wheel mount 23, the post 24 may be positioned at different angles, depending upon the style of bike desired. In the illustrative "upright" style, the post is close to vertical, at a small angle with the fork prongs as shown in exaggerated fashion in FIGS. 4 and 5. This creates an offset for the post from the fork in the folded position, increasing the displacement created by the tilted hinge axis 39. When the angle of the post is changed to produce different styles of bicycle, the angle of the hinge also can be changed to insure that the handlebar and post are located in the folded condition in the proper position for compact folding of the bicycle.

A latch 61 for the steering post 24 operates between the two bases 41 and 55, on the side of the post opposite the hinge pin 54, to hold the bases rigidly together for normal operation. The latch used in this invention is particularly advantageous, because it is readily accessible to be released quickly and easily, while being unobtrusive when latched and when unlatched, re-latches automatically as an incident to return of the post to its upright position, and securely and safely holds the post when it is latched.

As shown most clearly in FIGS. 18 to 21, the latch 61 is of the overcenter toggle type having an actuator arm 62 of channel-shaped cross-section that is pivoted at its lower end on a pin 63 secured between two wings 64 on the hinge base 55, opposite the hinge pin 54, a second arm 65 in the form of a connecting rod that is pivotally connected at one end to the free upper end of the actuator arm by a pin 67 and at the other end to the base plate 41 of the post 24, on a pin 68 between two wings 69 thereon normally overlying the wings 64, so that the pin 68 overlies the pin 63 and the second arm 65 generally parallels the actuator arm 62 and lies within the channel therein in the latched position. The upper pin 67 at the "knee" of the toggle joint is overcenter relative to the lower pivot pins, to the right as viewed in FIG. 20, to lock the latch closed. The opposite end portions of the second arm 65 are oppositely threaded fittings into which the connecting rod portion is threaded, so that the length of this arm is readily adjustable. A torsion spring 70 is coiled around the pin 63 with one free end portion 70a against the actuator arm and the other free end 70b against the hinge base 55 to urge the actuator arm clockwise (FIG. 20) and produce a self-locking action upon return of the post to the upright position, and also to resist inadvertent unlatching.

It will be noted that in the upright position of the actuator arm 62 along the post, the actuator is completely unobtrusive and out of the way. At the same time, it is readily accessible to unlatch the post 24 for folding, and release the post after a simple and quick flip of the actuator arm 62 away from the post, allowing it to be moved to the position shown in FIG. 19, but preferably after reversal of the wheel. In the unlatched condition, the latch has no loose components to flop or rattle, and has a low profile that adds little or nothing to the overall folded size of the bicycle. Upon return of the post to the upright position in FIGS. 18 and 20, the latch re-latches with a snap action, and holds the post securely in place.

Another space-saving feature is the vertical compactness of the wheel support 23 and the steering bearing 40 therein, which is of the "ball bearing" type that conventionally has been made as a "headtube" that is several inches long in order to sustain the torque forces to which the bearing is subjected in operation of the bicycle. It has been found that such length is unnecessary if, instead, the bearing is made considerably wider and flater, apparently because the increased lateral separation of the races of the bearing and the proportionate increase in the number of balls therein produce similar torque and superior thrust-carrying capabilities, as compared to the greater longitudinal separation of the races in conventional bicycles.

Shown in FIGS. 22 and 24 are alternative bearings, the basic bearing of FIG. 22 having parts indicated by the same reference numbers used in the preceding drawings, and being the presently preferred embodiment. This bearing has two series of balls 71 that roll in raceways defined between an internal flange 72 in the arcuate sidewall 23a of the wheel mount, an upper bearing ring 73 that abuts against the underside of the hinge base 55, and a lower bearing ring 74 that abuts the upper end or crown 22 of the wheel support. Herein, the opposite sides of the internal flange 72 are formed with oppositely opening grooves constituting the lower race of the upper series of balls 71 and the upper race of the lower series, and the upper ring has a grooved lower end which forms the upper race for the upper series of balls. The lower race for the lower series of balls is a V-groove in the lower ring 74. The upper bearing ring is internally threaded and for fine adjustment of the entire bearing assembly is held on an externally threaded coupling 76 that projects upwardly from crown 22 of the wheel support 23 and a machine screw 77 extends downwardly through a hole 78 in the hinge base and is threaded into the coupling 75 and the crown 22 of the fork, thus clamping the bearing elements together and joining the steering post 24 to the wheel support through the hinge and the bearing.

Also shown in FIGS. 22 and 23 are means for maintaining the general angular alignment of the handlebar post 24 with the fork, despite angular displacement which may result from a crash or abusive handling. While this may take various forms, one suitable form includes a tubular retainer 79 (see FIG. 23), with locating lugs 80 spaced around its upper end, attached to the lower portion of the bearing assembly. Herein, the retainer is brazed into the coupling rib 75, with the lugs 80 projecting upwardly through a hole 81 in the bottom wall of the hinge base 55.

Fitted into the hinge base 55, which has a downwardly tapering inside wall 82, is a retainer cup 83 that has a downwardly tapering outside wall 84 sized to be wedged into the hinge base. This cup has arcuate slots 85 in its bottom wall through which the lugs 80 project, to form a limiting connection between the cup and the retainer, and thus with the wheel supporting fork. The cup 83 produces a strong frictional force resisting misalignment. Realignment is achieved by first loosening the screw 77, then aligning the parts, and then re-tightening the screw 77. This is but one of the wheel-alignment arrangements that may be used.

The alternative bearing shown in FIG. 24 is similar in construction, and corresponding parts are shown with corresponding primed reference numbers. This bearing has one set of balls 71' that ride in a raceway formed between an internal V-groove in the band 23a' of the wheel mount 23', and two external beveled edges of an upper bearing ring 73' a lower bearing ring 74'. In other respects, this bearing is the same as that in FIG. 22.

With each of these bearings, the total height is about one-quarter the width. For example, the bearing may be less than two centimeters in height, FIGS. 22 and 24 being shown in approximately full scale for the preferred embodiment of the bicycle.

The folding frame 13 is made in two sections that are generally flat sided and flat topped, and are pivotally joined together by a mid-frame hinge 88 defining an upright axis 89 that is midway between the front and rear axles 21 and 18 when the front wheel is positioned for folding of the frame, the actual position being different when wheel reversal is to be used during folding, as here, and when it is not to be used. This permits the two sections to swing into a side-by-side folded condition with the two axles in end-to-end relation, with the two wheels 11 and 12 side-by-side, and with the folded handlebar 25 compactly disposed between the wheels.

The preferred frame construction for combined lightness and strength is a framework of welded tubular struts, herein in an open-frame or a box-like configuration in which both the front section and the rear section are of generally triangular shape, the flat bases of the triangular sections being butted together at the mid-frame hinge 88. This so-called "diamond" frame configuration, producing an overall parallelogram-like frame shape, is generally similar to that used in conventional non-folding bicycles, but has not been usable in most folding bicycles.

As shown in FIGS. 1 and 2, the front frame section has a flat upper side generally in the position of a conventional "top tube", formed by two horizontal struts 90 with forward end portions converging toward and fastened to a rearward extension 23b of the wheel mount 23, a downwardly and rearwardly inclined underside, generally in the position of a conventional "down tube", formed by two inclined struts 91, also with converging forward end portions fastened to the wheel mount, and an upright rear side formed by two vertical struts, one forming the mid-frame hinge 88 and the other, numbered 92, being welded at its ends to the upper and lower struts 90 and 91 on one side of the frame. Two horizontal cross-struts 93 complete the rear side as a rectangle. It will be seen that both the upper side and the underside can be formed by a single "top tube" and a single "down tube" if desired, without detracting from the structural integrity and if a front storage space (to be described) is not desired.

The rear frame section (apart from the rack 26) has a downwardly inclined upper side that is formed by two elongated struts 94 that extend rearwardly to the rear axle 18, generally in the position of conventional "seat stays", each being connected to the seat assembly and to the rack 26 at its upper end. The rear frame section has a generally horizontal lower side formed by two struts 95 extending forwardly and slightly downwardly from the rear axle, generally in the position of conventional "chain stays", and an upright front side formed by two vertical struts 97 that are welded at their upper and lower ends to the forward ends of the rack, which herein is a U-shaped tubular strut reinforced by two cross-struts 26a. Two short horizontal cross-struts 98 complete the front side of the rear frame section as a rectangle, and a third short cross-strut 99 (FIG. 2) preferably extends between the two upper struts 94 to provide a mount for the rear brake 30. The opposite ends of the rear axle 18 are received in and bolted to two mounts 100 forming the rear wheel "drop outs", and constituting the rear end of the rear frame section. The rear end of the rack is supported by two braces 101 joined at their lower ends to the rear mounts 100. The ends of the axle preferably have very short laterally projecting ends, and may be covered to further reduce the number of protruding parts.

As can be seen in FIGS. 1 and 2, the uppermost parts of the front and rear frame sections lie generally along an imaginary horizontal reference line extending from the front wheel mount to the rear of the bicycle, producing a flat-topped, low-profile frame that also is relatively flat sided and without objectionable protruding parts. This frame is only slightly higher than the small-diameter wheels, and is of approximately the same width as the wheels and their supports, including their axles, for optimum compactness in the folded condition, as will be seen.

To form the mid-frame hinge 88, a pivot sleeve 102 (see FIGS. 1 and 3) is mounted in parallel alongside one of the upright struts 97 of the rear frame section, herein the right-hand strut as viewed in FIG. 3, and a hinge pin 103, shown in broken lines, is fitted rotatably in the sleeve and captured at its ends in two coaxial caps 104. The sleeve and the caps, joined by the hinge pin 103, make up one vertical strut of the front frame section, on the side of the frame opposite the sprocket 15, as well as forming the mid-frame hinge. For optimum folding, the hinge sleeve 102 preferably is offset slightly rearwardly and outwardly around the strut 97 of the rear section, about sixty degrees away from front-to-rear alignment.

Figure 29:
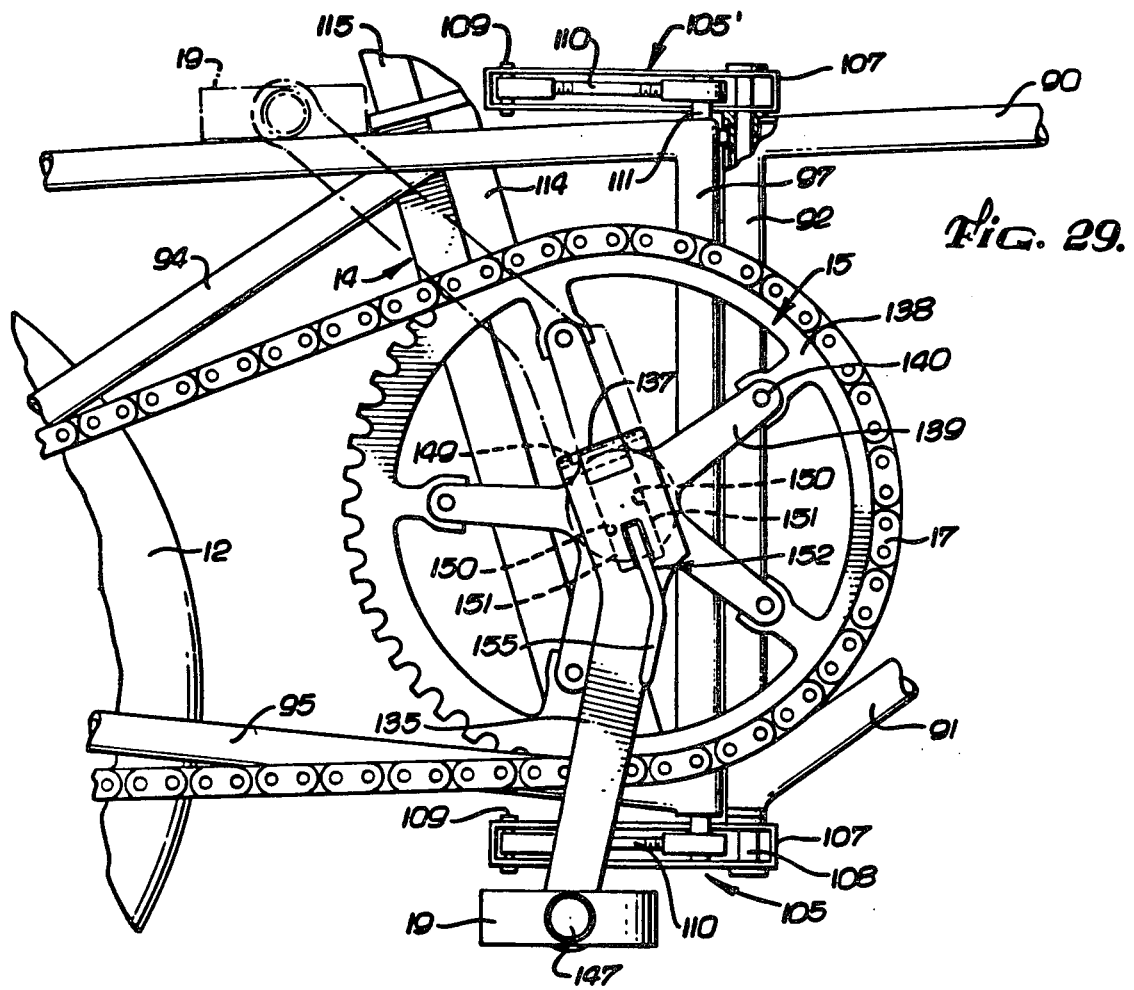
FIG. 29 is a view similar to FIG. 25 but taken from the opposite side of the mid-frame area, the side shown in FIG. 2, and showing the folded condition of the crank on the other side in broken lines.

A mid-frame latch 105 is located on the other side of the frame 13 from the hinge 88, and preferably is an overcenter toggle latch similar to the steering post hinge latch 61 in construction and operation. For this purpose, an actuator arm 107 (FIGS. 3, 29 and 30 to 32) is pivoted at one of its ends on the underside of the front frame section, herein by a headed pin 108 (FIG. 31) projecting downwardly out of the adjacent vertical strut 92 forming the rear side of the front frame section. The free end of this actuator arm, which preferably is of channel-shaped cross-section like the arm 62, is pivotally connected by a pin 109 to one end of an adjustable second arm 110, and the other end of this second arm is pivoted on a pin 11 projecting downward from the lower cross-strut 98 of the rear section. Thus, when the frame is unfolded and the latch 105 is closed (FIGS. 1 and 29), the two pivot pins 108 and 111 are side by side, and the two latch arms extend rearwardly in overcenter latched condition, as shown in FIG. 29. When the actuator arm 107 is swung inwardly, the latch opens to permit the frame sections to be folded to the position shown in FIGS. 3 and 32, in which the arms 107 and 110 are generally in line and connected across the mid-frame of the bicycle.

For double latching at vertically spaced points, the latch pin 108 extends through the strut 92 and projects from the upper end, the pin 108 being rotatably supported by bushings 112 (see FIG. 31), and a duplicate latch 105' is formed on top of the frame, corresponding elements of this latch being indicated by the same reference numbers in the drawings. If desired, the top latch may be eliminated or simplified because of the concentration of forces during riding at the lower latch. With or without the upper latch, the lower latch very securely holds the frame latched, with the actuator arm 107 unobtrusively located in a front-to-rear position beneath the frame, yet easily accessible to be flipped open to release the frame. The latch remains unobtrusive when the frame is folded, as shown in FIG. 3, to permit use of the pivot sleeve 102 and the adjacent strut 97 as a carrying handle.

To hold the folded frame sections firmly together in the folded condition a simple catch 194 (FIG. 1) is mounted on one of the sections to engage a strike 195 on the other section. Herein, the catch 194 is a generally U-shaped strip of spring metal forming a constricted opening that is mounted on the rear rack 26 above the rear wheel 12, and the strike 195 is arrowhead-shaped and is attached to the post 24 in position to enter and be held releasably by the catch. These elements tie the folded package together in an easily handled package.

Although the folded bicycle 10 may be left on its wheels in a generally horizontal position, or laid on its side for storage, the frequently preferred position for storage is "on end", with the mid-frame ends facing up, as shown in FIGS. 3 and 8, with the mid-frame hinge 88 and the adjacent strut 97 conveniently positioned to serve as a carrying handle, as shown in FIG. 3. It will be seen that the rear ends 27a and 28a of the fenders are extended downwardly and outwardly to lie along horizontal lines that are tangent to the wheels in this upright position, to provide a four-point stance for the folded bicycle. If front wheel reversal is not used during folding, either a three-point stance is used, or the front end of the front fender 27 is positioned to provide the fourth point.

The collapsible seat assembly 14 is integrated compactly into the rear frame section in a manner that not only securely supports a seat or saddle 113 but also reinforces the frame 13. As can be seen in FIGS. 1 and 2, the seat assembly herein comprises three telescoping tubular seat post sections 114, 115 and 116, the first forming the base of the post and the other two constituting extension sections for elevating the seat 113 to a desired height. For non-rotational support, the sections are of non-circular cross-sectional shape, herein square, and a quick-release latch 117 is provided at the upper end of the intermediate section 115 and on the lower section 114 for holding the next upper section securely in the extended position, which preferably is determined by an adjustable limiting cable (not shown) similar to the steering post cable 49, anchored at its lower end in the base section 114 and at its upper end to the upper section 116. Reference is made to the aforesaid patent for details regarding such a cable.

The lower latch 117, as shown in detail in FIGS. 5, 25 to 27, is mounted on one side of the lower post section 114, preferably well below the upper end thereof, and comprises a latch arm 118 that is pivotally mounted at one end on a pin 119 that is supported between the two parallel sides 120 of a U-shaped channel forming the body of the latch. The channel is fastened to the side of the lower post section with the pivot pin 119 parallel to the longitudinal axis of the post.

The latch arm 118, which preferably is a flat, rectangular plate fitting loosely between the two sides 120 of the channel, has a latch lug 121 on its inner side for projecting through opening 122 and 123 in the channel and the lower post section 114 and into an aligned opening 124 in the intermediate post section, thereby to latch the two sections against relative sliding movement. The latch lug 121 fits relatively snugly between the upper and lower walls of the openings 122, 123 and 124, for a minimum of play in the post.

To urge the latch arm 118 yieldably toward the latched position (FIG. 26), a spring 125 is coiled around the pin 119 and anchored at one end 126 in the channel, with its other end 127 extending along the outer side of the latch arm. The free end portion 128 of the latch arm projects slightly beyond the post to provide an easily accessible grip for use in disengaging the latch. The upper latch 117 is the same as the lower latch, so the details are not repeated in this disclosure.

For adjustability of the length of the seat post, at least one of the inner telescoping post sections 115 or 116 should have a series of longitudinally spaced holes 124 for alignment with the outer holes 122 and 123 in different telescoped positions of the seat post. Herein, the holes 124 are provided in both sections 115 and 116, and are shown by broken lines in the intermediate section 115. The length of the seat-height cable can be set with the latch engaged in a hole 124 producing the desired height, after which the cable will limit the extension of the seat post to that height while the latches are unlatched, contributing to quick unfolding of the bicycle. Similar latch holes are provided in the intermediate and upper sections for engagement with the latch lugs 121 when the seat post is collapsed, so as to hold the post securely in the collapsed condition.

The position of the base section 114 in the frame 13 determines the angle of the seat post relative to vertical, this angle being conventional and approximately fifteen degrees as shown in the drawings. The lower end of the base section is welded between the two lower struts 95 and to the lower cross-strut 98, and the upper end portion is welded between the two upper struts 94. Preferably, a transverse mounting sleeve 130 for the sprocket/pedal assembly also is welded to the base section, having a notch 130a for interfitting with the base section across its front side, and also is welded to the front struts 97, thus tying the seat post and all of the other elements together.

Figure 25:
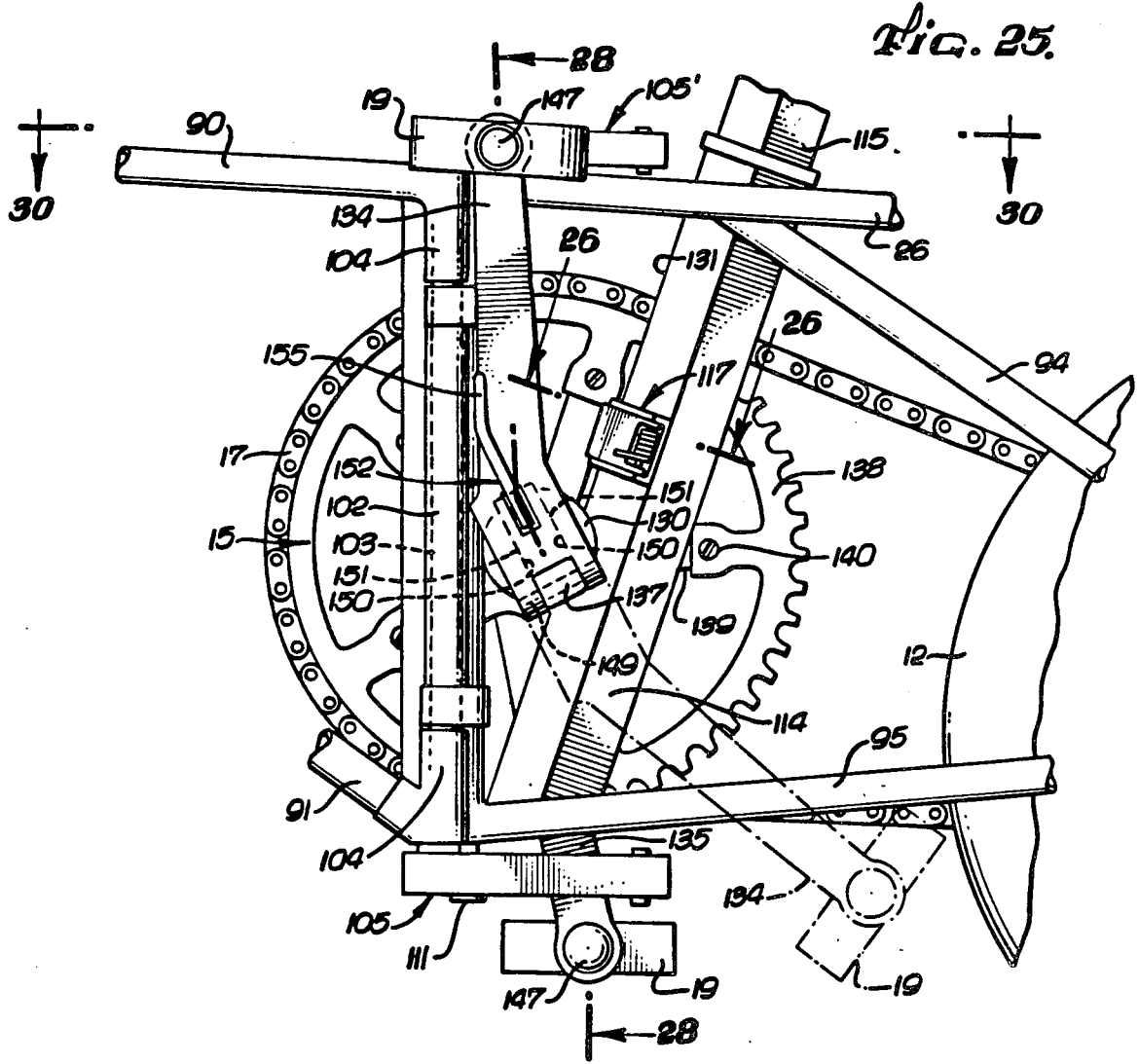
FIG. 25 is an enlarged fragmentary side elevational view of the mid-frame area in FIG. 1, with the folded position of one crank and pedal shown in broken lines.
Figure 27:
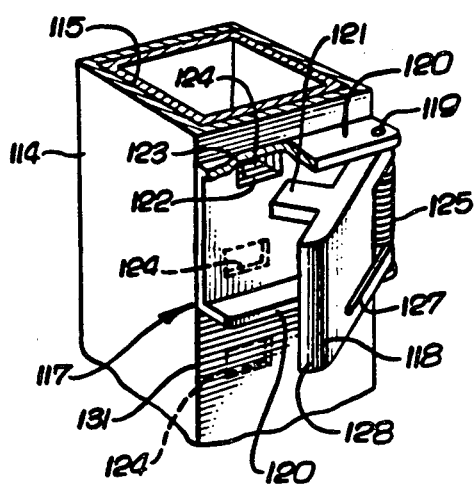
FIG. 27 is an enlarged fragmentary perspective view of parts of FIG. 26, taken in the direction of the arrow 27 therein and partly in cross-section, showing a seat post latch in the released condition.
Figure 26:
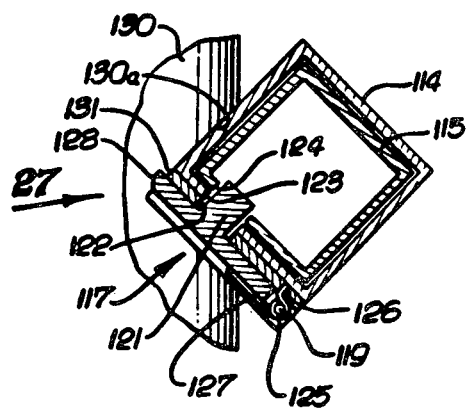
FIG. 26 is an enlarged fragmentary cross-sectional view taken along line 26—26 of FIG. 25.

As shown herein, the square tubular sections are oriented with a corner or edge 131 facing forward, as shown most clearly in FIGS. 25 and 26. This provides a nesting effect under the downward and rearward force produced by the weight of a person on the seat, for a firmer fit and less "play" in the seat assembly. The latches 117 may be located on any side, but preferably are on one of the front sides with the gripping edges 128 overhanging the front edge 131.

The sprocket/pedal assembly of the preferred embodiment comprises a basically conventional drive sprocket 15 or chainwheel that is rotatably mounted on the rear frame section by means of an axle 132 that is journaled in the transverse sprocket sleeve 130 in anti-friction bearings 133 (FIG. 28), and two foldable pedal cranks 134 and 135 that are pivotally mounted on connectors 137 on the opposite ends of the crankshaft 132 for swinging into out-of-the-way positions tucked into the frame 13.

As shown in FIGS. 25, 28 and 29, the drive sprocket 15 comprises a relatively large sprocket ring 138 with a series of sprocket teeth around its outer periphery, and a central body or "spider" 139 with angularly spaced radial arms that are fastened to the ring by screws 140. The sprocket body is fitted non-rotatably onto a tapered end portion 141 (FIG. 28) of the crankshaft and clamped against a shoulder thereon by a bolt 142 that is threaded into the end of the shaft through one of the connectors 137, the other connector being similarly fastened by a bolt 143 to a tapered end portion 144 on the opposite end of the crankshaft, both of these tapered ends preferably being splined or otherwise made non-circular for a non-rotational fit. End rings 145 are threaded into the opposite ends of the sleeve 130 to retain the bearings 133 therein, with the crankshaft projecting outwardly through each ring.

This is an illustrative mounting arrangement for the connectors, which could be replaced by other conventional crank mounting arrangements that are well known in the trade.

Each of the pedal cranks 134 and 135 is an elongated arm carrying a rotatable pedal 19 on a headed shaft 147 adjacent its free, radially outer end, the pedals being horizontal in the normal operating positions of the cranks. The radially inner end portion 148 of each crank overlies one end of the crankshaft 132 and the connector 137 thereon, and is drivingly coupled to the crankshaft through the connector in the normal operating condition of the assembly. This driving connection is formed by a pivot pin 149, opposed driving abutments 150 and 151 on the crank and on the connectors, respectively, and a quick-release latch 152, which normally maintains the driving abutments in opposed and coupled relation.

As can be best seen in FIGS. 25, 28 and 29, the inner end portion 148 of each crank 134, 135 is thickened and slotted on its laterally inner side to form two spaced driving lugs with spaced parallel, generally radially disposed inner sides forming the abutments 150, which are disposed on opposite sides of the associated connector 137, the latter being a short bar having flat and parallel, generally radially disposed opposite sides constituting the abutments 151, the assembly thus having male connectors on the crankshaft engageable with female connectors on the cranks, providing relatively large driving surfaces with relatively small lateral dimensions and overall lateral compactness resulting from use of the same lateral space for the mounting of the connectors and the driving surfaces. The inner end portions of the cranks extend beyond the sprocket axis 153 and are pivoted on the connectors, on the side of the sprocket axis opposite the pedals, by the pivot pins 149 (FIG. 28) which are fastened in the driving lugs and extend through the connectors in planes that are perpendicular to the sprocket axis.

The connectors have laterally inner faces that lie against the sprocket on one side and adjacent a shoulder on the other, and the cranks have laterally inwardly facing locating surfaces 154 which abut against the outer sides of the connectors to determine the normal operating positions of the cranks. Thus, the laterally inner sides of the radially inner end portions 148 need not abut against the sprocket or the shoulder on the crankshaft, and may be shaped for greater compactness in the folded positions.

To lock the cranks releasably in these operating positions, the latches 152 (see FIG. 28) are positioned on the side of the sprocket axis 153 opposite the pivot pins 149 and act between the cranks 134, 135 and the connectors 137, each latch herein being in the form of a bell crank having one elongated actuating arm 155 extending radially outwardly along the crank from a pivot pin 157 supporting the latch on the crank, and a second, latching arm 158 extending laterally inwardly through a passage 159 in the crank to lie alongside an end of the associated connector 137. On the free inner end of the latching arm is a hook-like latching abutment 160 having a laterally outwardly facing surface for engagement with a laterally inwardly facing latching shoulder 161 on the connector. A coiled compression spring 162 is confined between a finger 163 that is an extension of the actuator arm 155 on the opposite side of the pivot pin 157, and constitutes means for yieldably holding the latches in the latched condition shown in FIG. 28, with the cranks securely engaged with the connectors 137.

When an actuator arm 155 is swung laterally outwardly against the force of its spring 162, however, the latching abutment 160 is disengaged from the latching shoulder 161 to permit the associated crank 134 or 135 to be swung away from the normal position, counterclockwise as viewed in FIG. 28, to the folded position shown in broken lines in FIG. 28. The actuator arms 155 are curved as shown in FIG. 25 to generally follow the angles of the cranks, but overhang slightly along one edge to facilitate grasping of the latches to release them and fold the cranks in a quick and simple operation.

The pedal cranks 134 and 135 are specially shaped to provide for more compact folding than would be possible with conventional straight cranks. First, the crank 135 on the sprocket side of the frame, on the right in FIG. 28, is inclined laterally outwardly from its inner end portion 148, to space the pedal from the sprocket for normal operating clearance. When this crank is folded, however, its folded inner side (164 in FIG. 28) is substantially perpendicular to the sprocket axis 153, and the crank as a whole is closer to the frame. The "hump" 165 on the radially inner end portion of the crank is the laterally outermost part of the pedal/sprocket assembly, and is only slightly beyond the connector 137 on the end of the crankshaft 132. The slight relief shown between the unfolded crank and the sprocket 15 slightly reduces the height of the hump 165.

On the other side, the radially outer end portion of the crank 134 is offset laterally outwardly from its inner end portion 148, as indicated at 167 (FIG. 28), to clear the laterally offset mid-frame hinge 88 on that side. When this crank is folded, it also is closer as a whole to the frame, with a relieved hump 168 that is the laterally outermost part.

Another feature of the special cranks is an angular offset of the outer end portion of each crank from a true radial position, each crank being bent at an angle of the order of thirty to forty degrees with the radially disposed inner end portion 148, for the outer approximately three-quarters of its effective length, as shown in FIGS. 2, 25 and 29. These angular offsets are to the rear, and make it possible to fold both cranks into positions in which the now-inwardly extending pedals 19 will tuck conveniently into the rear frame section, while maintaining a normal operating relationship between the pedals when the cranks are unfolded. It will be evident that, with the angular offsets of the inner end portions, the connectors 137 are not angularly aligned with each other, but rather are aligned with the inner end portions of their respective cranks.

FIG. 25 illustrates in full lines the preferred starting position for folding the pedals 19, with the sprocket-side pedal lowered and the other pedal raised. When the raised pedal is unlatched and swung downwardly, the angular offset shifts the pedal rearwardly, away from the underside of the sprocket, to the position shown in broken lines, under the frame strut 19 and immediately in front of the rear wheel. The position of the strut and the length of the folded crank are correlated to position the pedal for latching engagement with the strut, as shown in FIG. 25, and as permitted by inherent flexibility of the parts. It is to be noted that the over-center position of the crank pivot pin 149 actually increases the folded lengths of the crank.

Similarly, when the lowered sprocket-side crank 135 is unlatched and swung upwardly to the folded position shown in broken lines in FIG. 29, the angular offset in the crank shifts its pedal 19 rearwardly as well, into a tucked position behind the seat post base section 114 and overlying the rack 26. Again, the position of the strut forming the rack and the length of the folded crank are correlated to provide for latching of the pedal over the strut, as permitted by the resilient flexibility of the parts.

DETAILED DESCRIPTION OF THE SECOND EMBODIMENT (FIGS. 33 TO 35)

Figure 33:
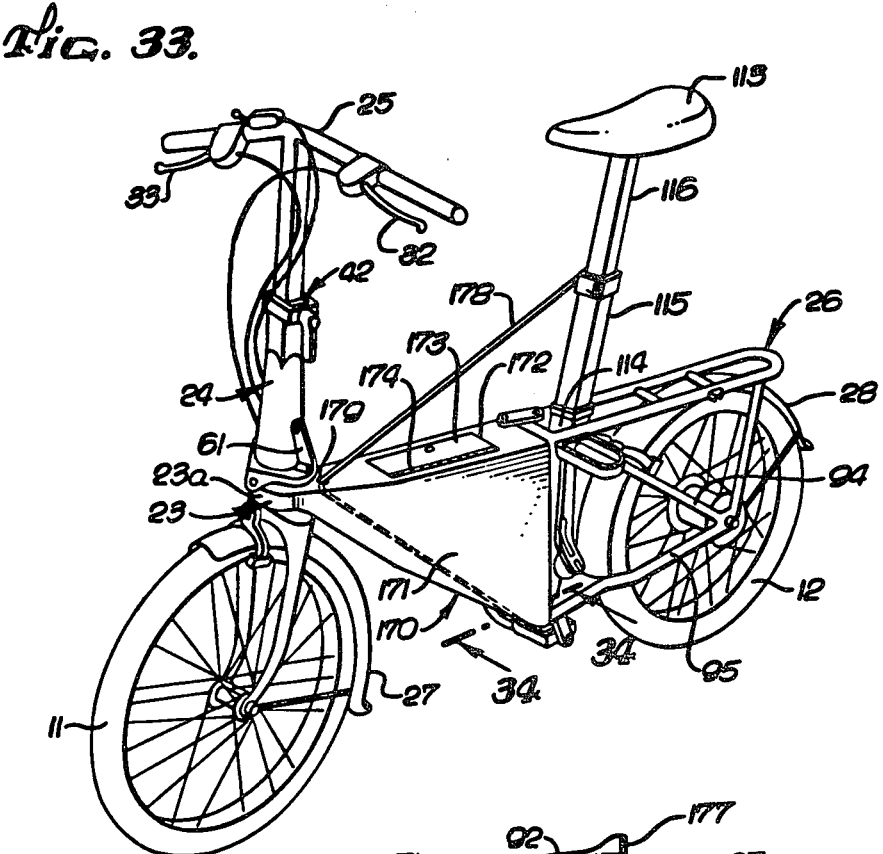
FIG. 33 is a perspective view similar to FIG. 1 but showing an alternative embodiment in which the front frame section is an enclosed compartment and including a bracing cable for the seat.
Figure 34:
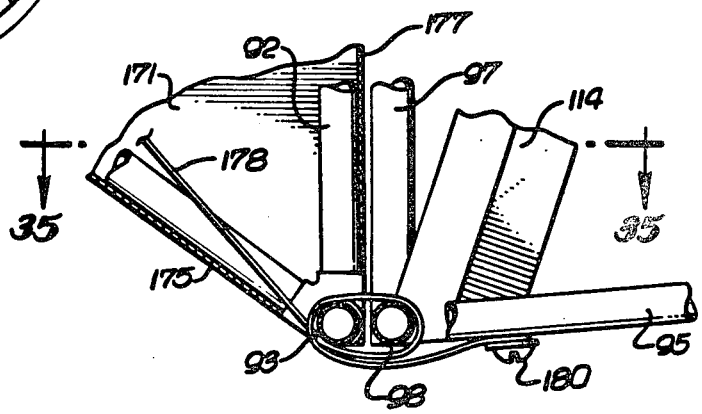
FIG. 34 is an enlarged fragmentary cross-sectional view taken substantially along line 34—34 of FIG. 33.
Figure 35:
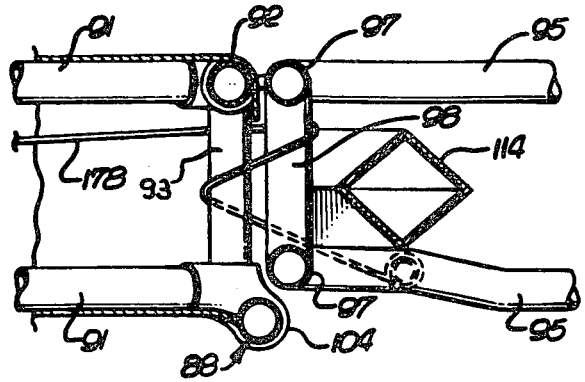
FIG. 35 is an enlarged fragmentary cross-sectional view taken substantially along line 35—35 of FIG. 34.

Shown in FIGS. 33 through 35 is a modified embodiment of the bicycle 10 with detailed features in addition to the features in the first embodiment. In view of the overall similarity of the basic elements of both embodiments, corresponding parts that may be the same are indicated by the same reference numbers used in connection with the first embodiment.

Figure 30:
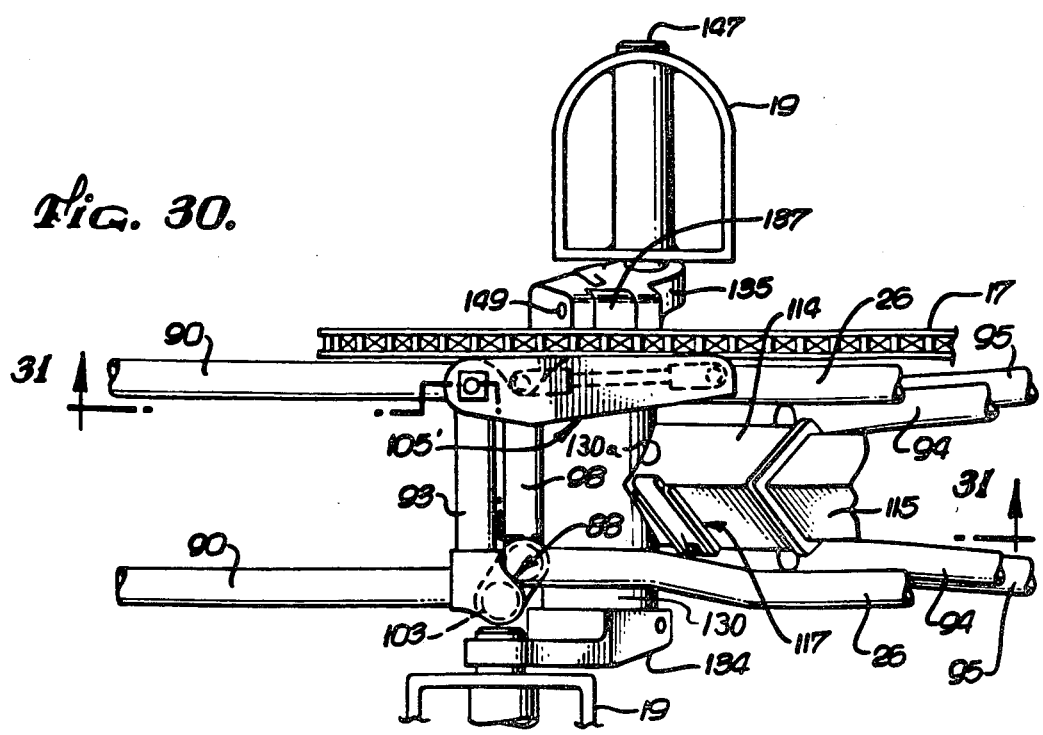
FIG. 30 is a fragmentary cross-sectional view taken generally along line 30—30 of FIG. 25.

The first optional feature, shown in FIG. 30 is the formation of the front frame section as a box-like enclosure, indicated generally by the reference number 170, that may be of the same triangular shape as the front frame section of the first embodiment, and indeed may be formed simply by covering that front frame section with sheet material such as fiberglass or sheet metal. As shown herein, the front section 170 is made up of two triangular side panels 171, a generally rectangular top panel 172 forming a front deck with a central access door 173 supported by a piano hinge 174 on one longitudinal side, and a generally rectangular bottom panel 175 closing the underside of the box. The rear side preferably is substantially closed by a rear panel 177, which may be a wrap-around extension of one side panel 171.

As shown in FIGS. 34 and 35, the struts of the front frame section of the first embodiment are within the enclosure 170, which is simply overlaid on the triangular framework. At the front end, the enclosure encases the rearward extension of the front wheel mount 23, and blends smoothly with the arcuate band 23a forming the front wheel bearing cage.

With the use of sufficiently strong material for the enclosure 170, the internal framework may be eliminated, and the wheel mount 23 may be joined to the front end of the enclosure, and the hinge 88 joined to one rear corner thereof, with the latch 105 mounted along the opposite rear corner. In all other respects, the basic components of the bicycle of the second embodiment may be the same as in the first embodiment.

The second optional feature illustrated in FIGS. 33 to 35 is a special flexible seat-bracing cable 178 that is usable with the bicycles of any of the embodiments to reinforce the seat structure 14 for unusually heavy riders, or to permit the use of lighter materials for the seat post sections 114, 115 and 116. This cable is attached at one end to the top of the intermediate section 115, and extends downwardly and forwardly to the front end portion of the frame 13. While it may be simply anchored to the frame (on the front wheel mount 13, for example), herein it extends into the front section through a hole 179, and then back through the enclosure 170 to a suitable anchor. To provide for taking up of slack in the cable 178 to some extent upon folding of the frame 13, and also to reinforce the mid-frame hinge latch 105, the cable 178 preferably is wrapped around the two lower cross struts 93 and 98 of the two frame sections, near the side of the frame opposite the hinge 88, and anchored on the rear section by a screw 180 that is set into the underside of one of the struts 95.

Accordingly, the cable holds the seat assembly 14 against rearward deflection under the weight of a heavy cyclist on the bicycle, and tension in the cable 178 resulting from the rearward force on the seat assembly is applied to the adjacent cross-struts 93 and 98 of the frame sections to bind them together, opposing the tendency of the weight on the center of hinged frame to spread them apart. Then, when the bicycle is being folded, the spreading of these two cross-struts during folding of the frame takes up some of the slack in the cable, to reduce its free length in the folded package.

DETAILED DESCRIPTION OF THE THIRD EMBODIMENT (FIGS. 36 TO 38)

An additional optional feature illustrated in FIGS. 36 through 38 is a "shopping cart" mode of the invention, in which the partially folded front and rear frame sections are held with the front and rear wheels 11 and 12 parallel and spaced apart, and an auxiliary wheel assembly 181 is attached to the mid-frame area to provide an extra wheel and form a three-wheeled cart. This feature makes it possible to use the bicycle to carry groceries of merchandise while shopping and then to convert back to the bicycle mode to carry the groceries or merchandise home. It also can be used with the fully folded bicycle, as a three-wheeled support permitting easy rolling rather than carrying, using the partially extended seat as a handle. Again, apart from the optional features, this embodiment may utilize the same basic components as the other embodiments, so corresponding parts are indicated by the same reference numbers, and duplicative drawing details are not repeated in these figures.

More specifically, a flexible elastic strap 182 (see FIG. 36) is provided to tie the two sections together in a partially folded condition with the wheels 11 and 12 parallel, the clip having hooks 183 at its ends for hooking around one side strut of the rack 26 when the strap has been looped around the front post 24 above the wheel mount 23. The detent strap 60 (FIGS. 16 and 17) has a second detent notch 184 engageable with the detent pin 59 o hold the steering assembly in the proper angular position for this mode.

It can be seen in FIGS. 36 and 38 that the pedal cranks 134 and 135 remain in their normal operating positions in this mode, with the crank 134 extending downwardly between the two partially folded frame sections and serving as a limiting stop preventing folding of the sections into side-by-side relation. The strap 182 pulls the two sections toward each other, and holds the front section snugly against the pedal crank 134 with the front wheel in the proper attitude, as determined by the detent pin 59 in the notch 184.

The auxiliary wheel assembly 181 comprises a small castor-type wheel 185 that is swivelly mounted on the lower end of a body 187 that is pivotally mounted at its upper end on a cross pin 188 spanning the two front struts 97 of the rear frame section, the body having a notch 189 (FIG. 37) in its rear side for receiving the lower cross-strut 98 of the rear frame section when the wheel is lowered, and releasing the wheel assembly to swing upwardly into a storage position (broken lines in FIG. 37) when not in use. A recess 190 in the front side of the wheel body 187 provides storage clearance for the sprocket sleeve 130. This entire assembly can be of molded plastic construction, weighing somewhere in the vicinity of one pound, and thus is light and relatively inexpensive.

When the bicycle has been folded to the shopping cart mode with the wheel assembly 181 lowered, the rear carrying rack 26 is available to carry groceries or other merchandise, possibly in a container that can be tied down to the rack. The handlebar 25 and front post 24 preferably remain in the unfolded condition, and the seat assembly is at least partially extended. When one of the seat post sections remains extended and the other collapsed, the seat 113 is at a convenient height to serve as a pushing or pulling handle for the "cart".

The bracing cable 178 may be provided for this embodiment, or may be omitted, depending upon the needs of the particular cyclist. It is omitted from FIGS. 36 through 38, for simplicity of illustration. Like the bracing cable, the auxiliary wheel assembly 181 and the elastic strap 182 may be made available as optional attachments for the basic bicycle, or omitted if a particular cyclist has no need for them, or does not want the added weight. For a person who uses the bicycle of the invention in shopping, however, these optional additions will significantly increase the utility of the bicycle.

DETAILED DESCRIPTION OF THE FOURTH EMBODIMENT (FIGS. 39 TO 42)

Shown in FIGS. 39 to 42 is an alternative embodiment of the handlebar and steering assembly indicated generally by the reference number 200, in which the handlebar 201 is turned from the normal laterally projecting position as a separate additional step, rather than by the positioning of the hinge for the steering wheel post 202. This is an alternative to the preferred automatic turning of the handlebar, but is usable to accomplish the same end result, if desired. Parts of this embodiment which may be identical to corresponding parts of the preferred embodiment are indicated by the same reference numbers previously used.

As in the preferred embodiment, the handlebar 201 is mounted on the upper end of a normally upright steering post 202, comprising a base section 202a and an extension section 202b telescoped therein, the handlebar having a central section that is secured to the upper end of the extension section of the post and laterally projecting opposite end portions 201a and 201b that are inclined downwardly and rearwardly in a shallow "V" configuration for relatively small front-to-rear displacement. The lower end of the post 202 is secured to a transverse base plate 203 which overlies a hinge base 204, and is pivoted on the hinge base by a hinge pin 205 on one side of the post, and a latch 207 is provided on the other side to secure the post in the upright position. As before, the hinge base overlies the front wheel mount 23, and the front wheel support 20, 22 extends downwardly from the front wheel mount to support a front wheel.

In this instance, the extension section 202b and the upper end of the base section 202a are of circular cross-section so that the handlebar 201 is rotatable relative to the base section about the longitudinal axis of the post, and means are provided for locating the extension section in different angular positions relative to the base section, for normal operation and for folding. For rapid location, a detent lever 208 is mounted on the outer side of the base section to extend longitudinally thereof, being pivoted on a lug 209 on the side of the base section, with a detent pin 210 adjacent its upper end extending into the base section through a hole 211 therein, and with its lower end portion yieldably urged outwardly by a leaf spring 212 confined between the lever and the base section.

Formed in the telescoping portion of the extension section is a series of longitudinal holes 213 which are alignable with the hole 211 in the base section to receive the inner end portion of the detent pin 210 in different longitudinal positions of the extension section, for adjustment of the height of the handlebar. These holes are alignable with the detent pin when the handlebar is in the normal operating position.

Spaced ninety degrees around the extension section 202b from the holes 213 is one hole 214 which is alignable with the detent pin 210 when the extension section is fully collapsed and the handlebar is turned ninety degrees to its folding position, shown in broken lines in FIG. 39. Thus, this hole cooperates with the detent lever 208 and the pin 210 to latch the handlebar in the folding position.

More secure latching of the handlebar 201 is accomplished by a quick-operating clamp 215 that is mounted on the upper end of the base section 202a to constrict the latter around the extension section 202b, the upper end portion of the base section being longitudinally split, as shown at 217, to render it sufficiently flexible for clamping. This clamp is capable of developing a high clamping force with a simple motion, and also is designed to remain unobtrusive despite variations that may occur in use.

More specifically, the clamp 215 comprises a split collar 218 that encircles the flexible upper end portion of the base section 202a, a screw 219 extending through a hole 220 in one end of the collar and is threaded into a hole 221 at the other end, and a lever 222 for tightening the screw to draw the two ends of the collar together. The screw has a tapered and splined head 223 which is received in a correspondingly shaped socket 224 in the lever, and a screw fastener 225 secures the lever on the head in different angular positions. This permits adjustment of the lever to insure that it is in an unobtrusive position alongside the post when it is clamped.

As can be seen in FIGS. 39 and 40, the hinge pin 205 in this embodiment is disposed along one lateral side of the post 202, rather than being inclined, so as to swing the post directly over to the side, without any turning motion, turning of the handlebar 201 being a separate operation. The hinge pin is positioned relative to the wheel support 20, 22 to fold the post into a position alongside the depending prong 20 of the fork in a manner similar to that shown in FIG. 3. The amount of separation of the post from the fork prong will depend upon the normal operating angle of the post relative to the wheel support. In all other respects, the bicycle of this embodiment may be the same as in the previously described embodiments.

SUMMARY OF FOLDING AND OPERATION

Specific reference is made to FIGS. 4 through 9, which represent in diagrammatic form the basic functional components of the bicycle in all of the various embodiments and the steps in folding a bicycle in accordance with the present invention. FIG. 4 shows the bicycle in a normal operating condition with both the seat assembly and the handlebar and steering assembly extended, the latter including partial extension of the upper post section 24b to a height somewhat above racing height. The pedals 19 are positioned as shown, with the sprocket-side pedal down.

As a preferred first step (FIG. 5), the clamp 42 is released to collapse the upper post section 24b and then reclamped, and the front wheel is reversed to the preferred folding position. Also, the two pedal cranks are released in succession, each by flipping its latch 152 and swinging the crank to a generally oppositely extending position, and engaging it with a frame member, as shown in other drawings.

Then, the latch 61 is released and the steering post 24 is folded over (FIG. 6), and the latches 117 are released in succession and the seat structure is collapsed. The only remaining step is to release the mid-frame latch 105, and to swing the two frame sections into side-by-side relation (FIG. 7), with the two axles end to end. The catch elements 194 and 195 are engaged as the sections come together, and thereafter latch the sections releasably together, for tightness of the folded package. It will be noted that the brake and gear-shift cables 34, 35 and 38 are positioned to lie compactly within the folded frame, and to be taken up to some extent, and neatly held, in the folded frame.

FIG. 8 illustrates a standing position of the folded package, which uses the rear ends 27a, 28a of the fenders, with the wheels, to provide four-point support, with the mid-frame hinge 88 and the adjacent strut 97 positioned to serve as a carrying handle. FIG. 9 shows a convenient rolling condition of the folded package, in which one section 116 of the seat post is extended to position the seat 113 to serve as a convenient towing or pushing handle.

Unfolding and set-up are accomplished by reversing the folding steps, first unfolding the frame and latching it open with the latch 105, then raising and latching the seat assembly and the handlebar post, returning the front wheel to its forward position, and swinging the pedal cranks back to their normal positions. Each of the cranks relatches automatically as an incident to its return to the normal position, as do the posts supporting the handlebar and the seat. Then, if further extension of the handlebar is desired, the clamp 42 is loosened to permit extension of the upper section, and is tightened to clamp the section in place.

If use in the shopping cart mode of FIGS. 36 to 38 is desired, the front wheel is turned to the partially reversed position for the cart mode, and the mid-frame hinge 105 is opened, with the pedals remaining unfolded and the handlebar up, and the elastic tie 182 is applied to hold the frame sections with the wheels parallel. Then the castor assembly is lowered (or installed, if it is not permanently installed) and the seat is set to the proper height to serve as a handle. To return to the bicycle mode, the castor is raised, the elastic tie is removed, and the frame and the front wheel are returned to their normal positions.

CONCLUSION

From the foregoing detailed description, it should be apparent that the present invention provides a unique foldable bicycle or other vehicle embodying several improvements which are effective separately and in combination to produce optimum results in terms of speed and convenience of folding and unfolding, and of compactness and regularity of shape of the folded package, in which the flat-topped, low-profile frame, having a width substantially the same as the width of the wheels and their supports, and is folded into a generally flat-sided compact package, without objectionable protruding parts and with the normally protruding components folded, tucked and stored tightly and securely in the frame. Moreover, the construction is capable of being mass-produced at a competitive cost with lightweight materials, using conventional manufacturing technology, and has operating characteristics that compare very favorably with other bicycles, being adaptible to different size requirements, different riding styles, and different drive mechanisms to suit the needs and preferences of different cyclists.

It also will be evident that, while the presently preferred embodiments have been shown in the drawings and described in detail, various modifications, changes and adaptations, including detailed design changes and additions, will become apparent to those skilled in the art and may be made without departing from the spirit and scope of the invention.

I claim as my invention:

1. In a foldable and portable bicycle, the combination of:
   first and second members that normally are disposed in side-by-side relation in a normal operating position and are swingable apart about a hinge between said members defining a hinge axis along one side; and a latch for holding said members releasably in said normal operating position, comprising an actuator arm, a first pivot spaced from and parallel to said hinge axis between one end of said actuator arm and said first member, a second arm lying alongside said actuator arm, a second pivot parallel to said hinge axis overlying said first pivot and connecting one end of said second arm to said second member, and a pivotal connection between the free ends of said arms, said pivotal connection being movable in one direction relative to said pivots into an overcenter latched position, and in the opposite direction relative to said pivots to an unlatched position.

2. A foldable and portable bicycle as defined in claim 1 in which said actuator arm is channel shaped and said second arm lies within the actuator arm in the latched position.

3. A foldable and portable bicycle as defined in claim 2 in which said second arm has reversely threaded connections at its ends for selective adjustment of its effective length.

4. A foldable and portable bicycle as defined in claim 1 in which said first member is a hinge base with said hinge axis along one of its sides, and said second member is a base plate for a steering post and being swingable upwardly when unlatched, said arms extending upwardly from said members to be alongside the steering post in the latched condition, and being swingable away from the post to the unlatched position to permit upward swinging of said base plate, and being extended across said hinge base as the base plate is swung away from the hinge base.

5. A foldable and portable bicycle as defined in claim 1 in which said first member as an upright end of a first frame section and said second member is an upright end of a second frame section and is swingable away from said first frame section as the frame is folded, said arms extending longitudinally along one of said frame sections in said latched condition and being movable laterally to the unlatched position, and being extended across said ends as the end of the second section swings away from the end of the first section.

* * * * *